United States Patent [19]
Komma et al.

[11] Patent Number: 5,737,296
[45] Date of Patent: Apr. 7, 1998

[54] FOCUS AND TRACKING ERROR DETECTION BY USING PLUS AND MINUS FIRST ORDER DIFFRACTED LIGHT

[75] Inventors: Yoshiaki Komma, Kyoto; Ken'ichi Kasazumi, Katano; Seiji Nishino, Osaka; Hiroaki Yamamoto, Katano, all of Japan

[73] Assignee: Matsushita Electric Industrial Co., Ltd., Osaka, Japan

[21] Appl. No.: 589,883

[22] Filed: Jan. 23, 1996

[51] Int. Cl.$^6$ ........................................ G11B 7/00
[52] U.S. Cl. ................... 369/103; 369/44.37; 369/109; 369/110; 369/112; 369/120
[58] Field of Search .................. 369/103, 109, 369/110, 112, 120, 44.37, 44.23, 41.21, 122

[56] References Cited

U.S. PATENT DOCUMENTS

| 5,406,543 | 4/1995 | Kobayashi et al. | 369/121 |
| 5,502,707 | 3/1996 | Komma et al. | 369/103 |

FOREIGN PATENT DOCUMENTS

| 460368 | 12/1991 | European Pat. Off. . |
| 692785 | 1/1996 | European Pat. Off. . |
| 2-185722 | 7/1990 | Japan . |
| 4-40634 | 2/1992 | Japan . |
| 8-22624 | 1/1996 | Japan . |

*Primary Examiner*—Georgia Y. Epps
*Assistant Examiner*—Kim-Kwok Chu
*Attorney, Agent, or Firm*—Ratner & Prestia

[57] ABSTRACT

An optical head device includes a light source for emitting light; an optical system for focusing the light emitted by the light source onto an information medium to form a light spot; a photodetector including a plurality of light detection areas for receiving the light reflected by the information medium and for outputting photocurrents in accordance with the respective amount of the light received; a holographic optical element for diffracting the light reflected by the information medium and for directing the light to the photodetector; and a signal processing circuit section for obtaining a focusing error signal and a tracking error signal for controlling the light spot using the photocurrents. The signal processing circuit section obtains the focusing error signal from the photocurrents which are obtained in accordance with the amount of light of one of ±Nth-order diffracted beams, and obtains the tracking error signal from the photocurrents which are obtained in accordance with the amount of light of the other of the ±Nth-order diffracted beams.

19 Claims, 24 Drawing Sheets

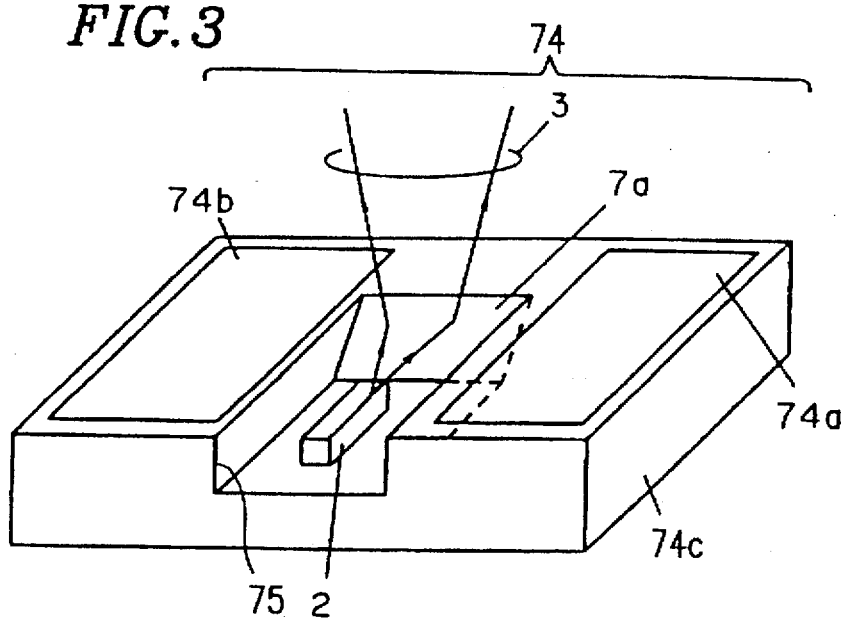
FIG. 3
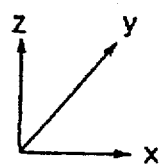

FIG. 4
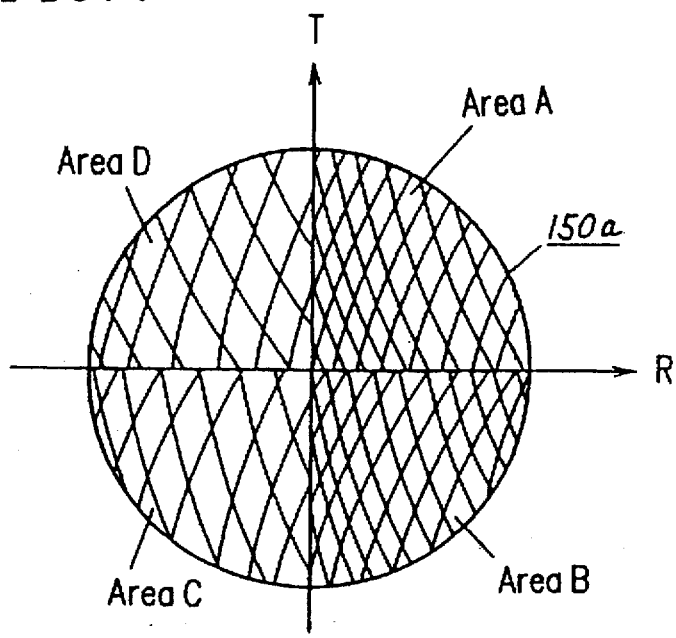
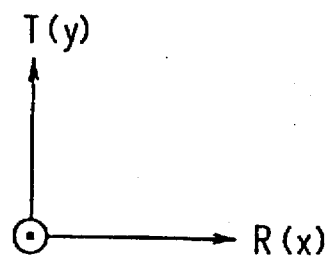

FOCUS AND TRACKING ERROR DETECTION BY USING PLUS AND MINUS FIRST ORDER DIFFRACTED LIGHT

BACKGROUND OF THE INVENTION

1. Field of the Invention

The present invention relates to an optical head device for recording information into an optical or magneto-optical medium such as an optical disc or an optical card, and for reproducing and erasing the information from such an optical or magneto-optical medium.

2. Description of the Related Art

Optical memory technology using an optical disc having pits as a high-density and large-capacity recording medium has been used for an increasingly wider range and is now used for digital audio discs, video discs, document file discs, and data files.

In an optical or magneto-optical system, information is recorded into and reproduced from a recording medium such as an optical disc using an optical beam which is converged to have a small diameter. Satisfactory and reliable performance of such recording and reproduction heavily depends on the optical system.

A main part of an optical system is an optical head device. Basic functions of an optical head device are (1) focusing light to have a minimum possible diameter which can be diffracted, (2) focusing control and tracking control, and (3) detection of pits.

Such functions are realized by combinations of various types of optical systems and various optoelectric conversion detection systems in accordance with the purpose and use. Especially, use of a holographic optical element for an optical pickup has recently been developed in order to reduce the size thereof. The inventors of the present invention disclosed an optical head device including a holographic optical element in Japanese Laid-Open Patent Publication No. 4-40634. In this optical head device, the holographic optical element has four diffraction areas, and light diffracted by these areas is received by at least one photodetector. By comparing phases of the output signals from the photodetector corresponding to the amount of the received light, a tracking error signal is obtained (phase difference method).

Referring to FIGS. 24, 25A and 25B, an optical head device 1000 disclosed in the above-mentioned publication will be described. In FIGS. 24, 25A and 25B, directions of x, y and z axes are the same. As is shown in FIG. 24, the optical head device 1000 includes a light source 2 such as a semiconductor laser, a collimating lens 1220, a holographic optical element 104, an objective lens 4, a recording medium 5, and a photodetector 7.

The optical head device 1000 operates in the following manner.

A light beam 3 emitted from the light source 2 (laser light) is incident on the objective lens 4 through the holographic optical element 104 and focused on the recording medium 5. The light beam 3 reflected by the recording medium 5 runs back on the same path to be incident on the holographic optical element 104. A plus first-order diffracted light beam 69 generated by the holographic optical element 104 is incident on the photodetector 7. The outputs from the photodetector 7 are used for obtaining servo signals (focusing error signals and tracking error signals) and an information signal.

FIG. 25A is a plan view illustrating a pattern 150c for a hologram formed on the holographic optical element 104.

The hologram is divided into a plurality of diffraction areas 151, 153a, 153b, 153c and 53id. Diffracted light beams used for detecting a focusing error signal are generated by the diffraction area 151.

A focusing error signal is obtained by, for example, a spot size detection (SSD) method. As is disclosed in Japanese Laid-Open Patent Publication No. 2-185722, the SSD method significantly increases the tolerance in assembling the optical head device and stabilizes the focusing servo signal detection against a fluctuation in the wavelength of the light.

In order to use the SSD method, the holographic optical element 104 is designed so as to generate two plus first-order diffracted light beams 69e and 69f which are spheric waves having different curvatures. One of such light beams 69e and 89f has a focal point between a light detection surface of the photodetector 7 and the holographic optical element 104, and the other light beam has a focal point on the Side of the photodetector 7 opposite to the holographic optical element 104. The two plus first-order diffracted light beams 69e and 69f are received by six detection areas FE81 through FE86 of the photodetector 7 as is shown in FIG. 25B. A focusing error signal FE is obtained by equation (1). In equation (1) and the following equations in this specification, outputs from detection areas are indicated by the reference numerals of the respective detection areas.

$$FE=(FE81+FE83-FE82)-(FE84+FE86-FE85) \quad (1)$$

A tracking signal TE is obtained in the following manner. Using the diffraction areas 153a through 153d, a change in light intensity distribution on the holographic optical element 104 is detected, which is caused by a change in the relative positions of the light spot and lines of pits in the recording medium 5. In other words, diffracted light beams 69a through 69d respectively generated in the diffraction areas 153a through 153d are received by light detection areas TE81 and TE82 for obtaining a tracking error signal. By comparing the phases of outputs from the light detection areas TE81 and TE82, a tracking error signal TE is obtained.

The optical head device 1000 having such a structure provides the following advantages.

(1) In such a structure, diffraction grating is formed in each of four quadrants made by imaginary x and y axes of the holographic optical element 104 (the radial and tangential axes in FIG. 25A), and a tracking error signal is obtained using the phase difference method. Accordingly, a stable tracking error signal which is not offset can be obtained even if the holographic optical element 104 is provided at a different position from a position set to avoid offsetting.

(2) By obtaining a tracking error signal using the phase difference method, adjustment of the positional relationship between the light spot and the tracks on the recording medium 5 is not required, as is required by the three-beam method. Accordingly, the productivity of the optical head device increases.

(3) By using the SSD method for obtaining a focusing error signal, the tolerance in assembling the optical head device increases.

(4) The system of using only the plus first-order diffracted light beams generated by the holographic optical element 104 to obtain a focusing error signal and a tracking error signal is suitable for providing the photodetector 7 only in one direction with respect to the light source 2 as is shown in FIG. 24.

In the above-described conventional structure, the plus first-order diffracted light beams generated by the holographic optical element 104 are divided in order to obtain a focusing error signal and a tracking error signal. Since minus first-order diffracted light beams are not used, the light utilization efficiency is low.

A low light utilization efficiency causes problems especially in the following cases: (1) where the output from the light source is small, (2) where the reflectivity of the recording medium is low, (3) where the light transmission efficiency of the optical system is low, and (4) where the recording medium from which information is to be reproduced is of such a rewritable type as to require sufficient reduction in the output for reproduction. The problems are, for example, (1) that the signal-to-noise ratio (S/N ratio) is reduced, and (2) that an excessively large offset is possibly generated in servo signals when the offset level in the circuitry changes in accordance with the temperature and time.

SUMMARY OF THE INVENTION

According to one aspect of the present invention, an optical head device includes a light source for emitting light; an optical system for focusing the light emitted by the light source onto an information medium to form a light spot; a photodetector including a plurality of light detection areas for receiving the light reflected by the information medium and for outputting photocurrents in accordance with the respective amount of the light received; a holographic optical element for diffracting the light reflected by the information medium and for directing the light to the photodetector; and a signal processing circuit section for obtaining a focusing error signal and a tracking error signal for controlling the light spot using the photocurrents. The signal processing circuit section obtains the focusing error signal from the photocurrents which are obtained in accordance with the amount of light of one of ±Nth-order diffracted beams, and obtains the tracking error signal from the photocurrents which are obtained in accordance with the amount of light of the other of the ±Nth-order diffracted beams.

In one embodiment of the invention, the holographic optical element includes a substrate having a hologram formed thereon having a plurality of diffraction areas, and each of the diffraction areas generates, as plus Nth-order diffracted beams, at least two light beams which are respectively focused between the photodetector and the holographic optical element and on one side of the photodetector opposite to the holographic optical element; and each of the diffraction areas generates, as minus Nth-order diffracted light beams, at least two light beams which are respectively focused between the photodetector and the holographic optical element and on one side of the photodetector opposite to the holographic optical element.

In one embodiment of the invention, where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area YP in the range of Y>0 and a diffraction area YM in the range of Y<0. The diffraction area YP generates, as plus Nth-order diffracted light beams, a light beam YP1 having one of a focal point and a focal line between the photodetector and the holographic optical element and a light beam YP2 having one of a focal point and a focal line on one side of the photodetector opposite to the holographic optical element. The diffraction area YM generates, as minus Nth-order diffracted light beams, a light beam YM1 having one of a focal point and a focal line between the photodetector and the holographic optical element and a light beam YM2 having one of a focal point and a focal line on one side of the photodetector opposite to the holographic optical element. The light beams YP1 and YP2 are separated from each other in the x direction on the photodetector, and the light beams YM1 and YM2 are separated from each other in the x direction on the photodetector.

In one embodiment of the invention, where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area XP in the range of X>0 and a diffraction area XM in the range of X<0. The diffraction area XP generates, as plus Nth-order diffracted light beams, a light beam XP1 having one of a focal point and a focal line between the photodetector and the holographic optical element and a light beam XP2 having one of a focal point and a focal line on one side of the photodetector opposite to the holographic optical element. The diffraction area XM generates, as minus Nth-order diffracted light beams, a light beam XM1 having one of a focal point and a focal line between the photodetector and the holographic optical element and a light beam XM2 having one of a focal point and a focal line on one side of the photodetector opposite to the holographic optical element. The light beams XP1 and XP2 are separated from each other in the y direction on the photodetector, and the light beams XM1 and XM2 are separated from each other in the y direction on the photodetector.

In one embodiment of the invention, the plurality of diffraction areas includes at least a first, a second, a third and a fourth diffraction area arranged clockwise. The photodetector includes a first, a second, a third and a fourth detection area respectively for receiving the minus Nth-order diffracted light beams from the first, the second, the third and the fourth diffraction areas. The first, the second, the third and the fourth detection areas respectively output a first, a second, a third and a fourth photocurrent based on the amounts of light received. The signal processing circuit section obtains the tracking error signal based on the first, the second, the third and the fourth photocurrents.

In one embodiment of the invention, the signal processing circuit section includes a phase comparison circuit for comparing the phases of the sum of the first and the third photocurrents and the sum of the second and the fourth photocurrents and then obtaining the differential phase, and obtains the tracking error signal using the differential phase.

In one embodiment of the invention, where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, an area including the first and second diffraction areas and an area including the second and fourth diffraction areas are divided from each other by a line extending substantially parallel to the y axis. The signal processing circuit section obtains the tracking error signal using the sum of the first and the second photocurrents and the sum of the third and the fourth photocurrents.

In one embodiment of the invention, the signal processing circuit section includes a phase comparison circuit for comparing the phases of the sum of the first and the third photocurrents and the sum of the second and the fourth photocurrents and obtaining the differential phase; a first tracking error detection circuit for obtaining a tracking error signal using the differential phase; a second tracking error detection circuit for obtaining a tracking error signal using the sum of the first and the second photocurrents and the sum of the third and the fourth photocurrents; and a switching device for selecting one of the first tracking error detection circuit and the second tracking error detection circuit.

In one embodiment of the invention, the first detection area and the third detection area are identical with each other, and the second detection area and the fourth detection area are identical with each other.

In one embodiment of the invention, the optical head device further includes a quarter-wave plate located between the holographic optical element and the information medium. The holographic optical element is an anisotropic holographic optical element for diffracting only linearly polarized light in a prescribed direction, and the light beam emitted by the light source is a light beam linearly polarized in a direction perpendicular to the prescribed direction; and thus the holographic optical element diffracts only the light beam incident thereon after being reflected by the information medium and transmitted through the quarter-wave plate but does not diffract the light beam incident directly thereon after being emitted by the light source.

In one embodiment of the invention, the optical system includes an objective lens for converging the light beam. The optical head device further includes a supporting device for supporting the objective lens, the quarter-wave plate and the holographic optical element at constant relative positions, thereby allowing the quarter-wave plate and the holographic optical element to move integrally with the objective lens.

In one embodiment of the invention, the photodetector includes a substrate having the plurality of light detection areas formed thereon, and the substrate has a concaved area having at least one inclined surface. The concaved area includes the light source therein. The optical head device further includes a reflective mirror located on the inclined surface for reflecting the light beam emitted from the light source in a direction substantially perpendicular to the substrate.

According to another aspect of the present invention, an apparatus for optically performing at least one of reproduction of information from a recording medium and recording of information to the recording medium, the apparatus includes the above-described optical head.

Thus, the invention described herein makes possible the advantages of (1) providing an optical head device for detecting a focusing error signal having satisfactory amplitude, S/N ratio, and sensitivity, and for detecting a stable tracking error signal having a satisfactory amplitude, S/N ratio, and sensitivity; and (2) providing an optical head device which can be assembled with a sufficient tolerance.

These and other advantages of the present invention will become apparent to those skilled in the art upon reading and understanding the following detailed description with reference to the accompanying figures.

BRIEF DESCRIPTION OF THE DRAWINGS

FIG. 3 is an isometric view of a hybrid device including a photodetector and a light source according to the present invention;

FIG. 4 is a plan view illustrating a hologram pattern according to the present invention;

DESCRIPTION OF THE PREFERRED EMBODIMENTS

Hereinafter, the present invention will be described by way of illustrative examples with reference to the accompanying drawings.

EXAMPLE 1

Figure 1:
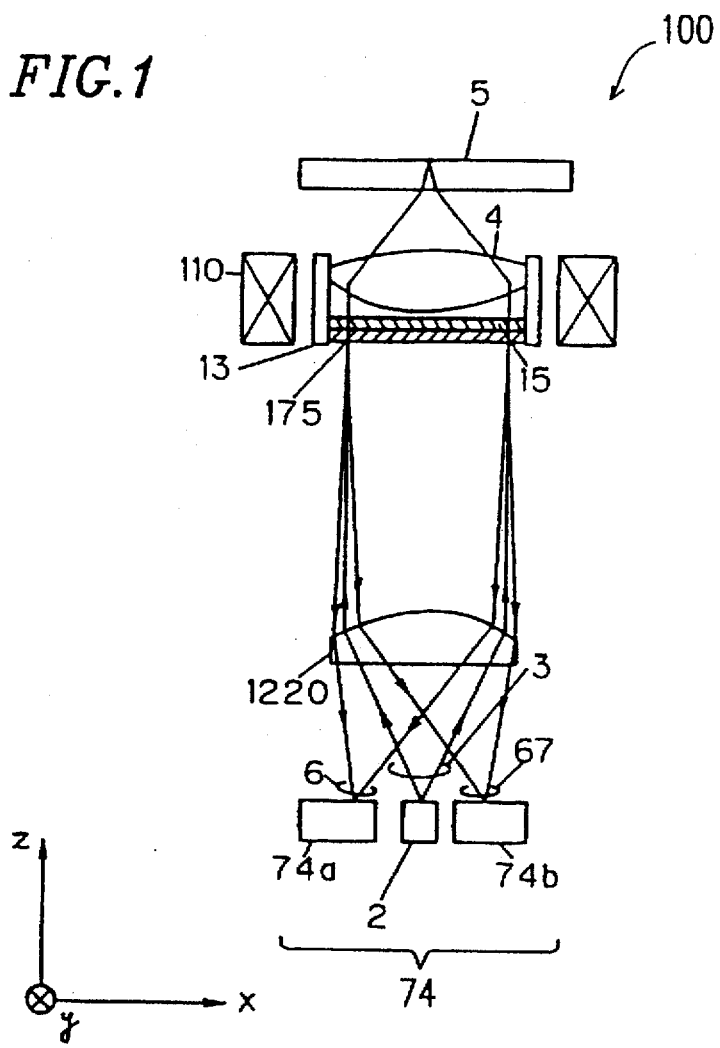
FIG. 1 is a schematic view of an optical head device in an example according to the present invention.

FIG. 1 is a schematic view of an optical head device 100 in an example according to the present invention. In FIGS. 1, 3, 5, 6, 8, and 10 through 19, directions of x, y and z axes are the same. In this specification, the directions of the x, y and z axes will be referred to as the "x, y and z directions", respectively. In this and the following examples, the same elements bear the same reference numerals.

As is shown in FIG. 1, the optical head device 100 includes a polarization anisotropic holographic optical element 175 (hereinafter, referred to simply as "holographic optical element 175") having a polarization characteristic which will be described later and a light source 2 such as a semiconductor laser.

First, the operation of an optical system of the optical head device 100 will be described together with the structure thereof.

A light beam 3 emitted from the light source 2 (laser light) which is linearly polarized is transmitted through the holographic optical element 175, is circularly polarized by a quarter-wave plate 15, and then is focused on a recording medium 5. Such a light path from the light source 2 to the recording medium 5 will be referred to as the "forward light path".

The light beam 3 is polarized in such a direction as not to be substantially diffracted by the holographic optical element 175, The light beam 3 reflected by the recording medium 5 runs back on the same path and is converted into a linearly polarized beam by the quarter-wave plate 15. The polarization direction of the light beam 3 after transmitting through the quarter-wave plate 15 is perpendicular to the polarization direction of the light beam 3 immediately after being emitted by the light source 2. Then, the light beam 3 is diffracted by the holographic optical element 175 to generate plus first-order diffracted light beams 6 and minus first-order diffracted light beams 67.

The plus first-order diffracted light beams 6 and the minus first-order diffracted light beams 67 are respectively incident on photodetectors 74a and 74b of a photodetector unit 74. By computing outputs from the photodetectors 74a and 74b, servo signals and an information signal are obtained. The light path from the recording medium 5 to the photodetectors 74a and 74b will be referred to as the "backward light path".

In such a structure, since the polarization anisotropic holographic optical element 175 for diffracting only a linearly polarized beam having a specific polarization direction is combined with the quarter-wave plate 15, unnecessary diffraction does not occur on the forward light path, but diffraction occurs on the backward light path back. Accordingly, the light utilization efficiency is sufficiently high to obtain a satisfactory level of amplitude, and further a sufficiently high S/N ratio is obtained due to the substantial elimination of noise caused by unnecessary diffraction.

Such a structure is especially advantageous when adopted in an optical head device used for, for example, an optical disc having a higher density than that of compact discs which are now commercially available. Due to the reduction in the unnecessary diffraction to substantially zero, the quality of servo signals including a focusing error signal and a tracking error signal and an information signal obtained is enhanced.

Moreover, the diffraction efficiencies of the plus first-order diffracted light beams and the minus first-order diffracted light beams can be raised, and the diffraction efficiency of a zero-order diffracted light beam (light transmittance) can be reduced. Thus, the intensity of light beam returning to the light source 2, which is the zero-order diffracted light beam, can be lowered. Accordingly, when a semiconductor laser is used as the light source 2, generation of noise caused by the returning light beam can be avoided.

Figure 2A:
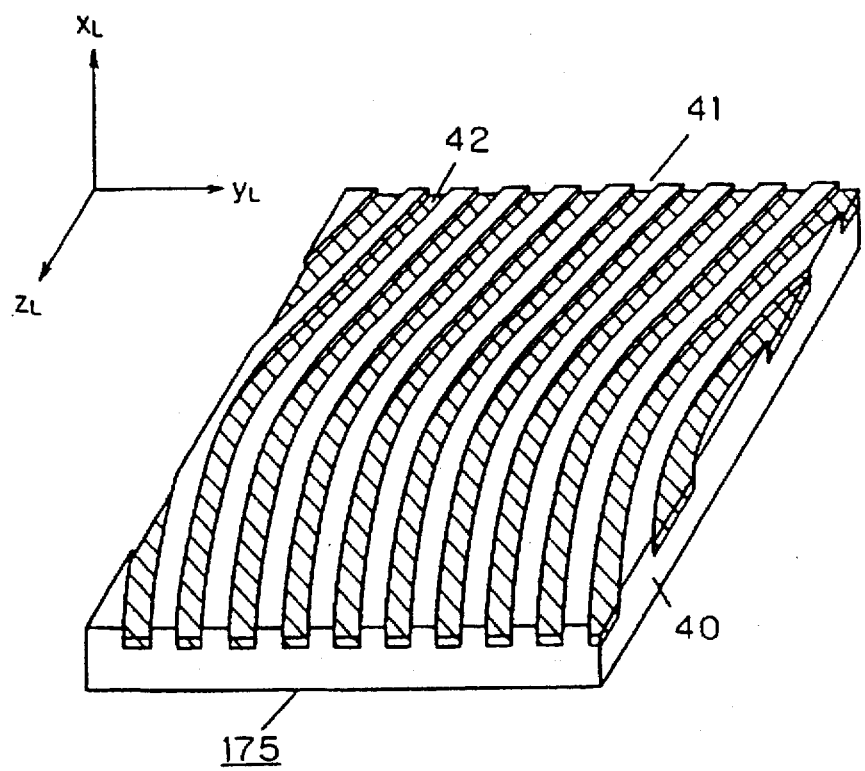
FIG. 2A is a view illustrating a structure of a polarization anisotropic holographic optical element according to the present invention.
Figure 2B:
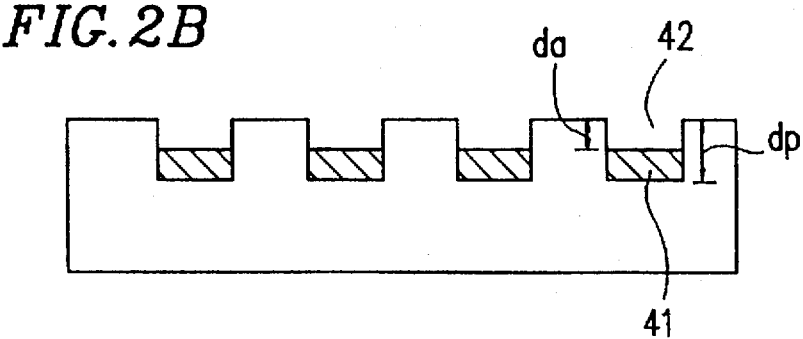
FIG. 2B is a cross sectional view thereof.

FIG. 2A is an isometric view of the polarization anisotropic holographic optical element 178 which can be used in the present invention. The XL, YL, and ZL axes in FIG. 2A are not related to the x, y and z axes shown in FIGS. 1, 3, 5, 6, 8, and 10 through 19. FIG. 2B is a cross sectional view of the holographic optical element 175.

As is shown in FIGS. 2A and 2B, the holographic optical element 175 includes a substrate 40 formed of, for example, lithium niobium. The substrate 40 has a surface parallel to the x-y plane shown in FIG. 1. A proton exchange layer 41 is formed in the substrate 40 to a depth of dp in a periodical pattern. Only the area of the proton exchange layer 41 in the substrate 40 is etched to form grooves 42 having a depth of da.

In this specification, "$n_o$" is the refractive index of the substrate 40 with respect to ordinary light; "$n_e$" is the refractive index of the substrate 40 with respect to extraordinary light; "$n_{op}$" is the refractive index of the proton exchange layer 41 with respect to the ordinary light; "$n_{ep}$" is the refractive index of the proton exchange layer 41 with respect to the extraordinary light; $\Delta n_o$ is the difference between $n_o$ and $n_{op}$; and $\Delta n_e$ the difference between $n_o$ and $n_{ep}$. $\Delta n_o$ and $\Delta n_e$ are respectively obtained by equations (2) and (3). The ordinary light is light having an electric field vector in the y direction of the crystal of lithium niobium or proton exchange layer. The extraordinary light is light having an electric field vector in the z direction of the crystal of lithium niobium or proton exchange layer.

$$\Delta n_o = n_{op} - n_o \qquad (2)$$

$$\Delta n_e = n_{ep} - n_e \qquad (3)$$

Compared with the refractive index of the substrate 40 with respect to light having a wavelength of 0.78 μm, the refractive index of the proton exchange layer 41 with respect to the light of the same wavelength is larger by 0.145 for the extraordinary light and smaller by 0.04 for the ordinary light. The polarization anisotropic holographic optical element according to the present invention utilizes such a difference between the refractive indices of the proton exchange layer 41 with respect to the ordinary light and with respect to the extraordinary light. The difference between the refractive index with respect to the extraordinary light of the substrate 40 and the refractive index with respect to the extraordinary light of the proton exchange layer 41 is counteracted by the grooves 42 formed in a surface of the proton exchange layer 41. Such a function of the holographic optical element will be described below.

First, the phase of the light in the case where ordinary light is incident on the holographic optical element 175 will be described.

The refractive index of each of the proton exchange layer 41 and the grooves 42 is smaller than that of the substrate 40. Accordingly, the phase of light transmitting through the proton exchange layer 41 and the groove 42 is ahead of the phase of light transmitting through The substrate 40. The level of the shift $\Delta \phi O$ of the phase is expressed by equation (4) where a forward shift is represented by a negative sign and a delay is represented by a positive sign.

$$\Delta \phi_o = (2\pi/\lambda)(\Delta n_o \cdot dp - \Delta n_{oe} \cdot da) \qquad (4)$$

where $\lambda$ is the wavelength of the light, and $\Delta n_{oa}$ is the difference between the refractive index $n_o$ of the substrate 40 with respect to the ordinary light and the refractive index 1 of air with respect to the ordinary light. $\Delta n_{oa}$ is expressed by equation (5).

$$\Delta n_{oa} = 1 - n_o \quad (5)$$

Next, the phase of The light in the case where extraordinary light is incident on The holographic optical element 175 will be described.

The refractive index of the grooves 42 is smaller than that of the substrate 40. Accordingly, the phase of light transmitting through the grooves 42 is ahead of the phase of light transmitting through the substrate, 40. By contrast, the refractive index of the proton exchange layer 41 is larger than that of the substrate 40. Accordingly, the phase of light transmitting through the proton exchange layer 41 is behind the phase of light transmitting through the substrate 40. As a result, the light transmitting through the proton exchange layer 41 counteracts the forward shift of the phase of The light transmitting through the grooves 42. The level of The shift $\Delta \phi_e$ is expressed by equation (6) where a forward shift is represented by a negative sign and a delay is represented by a positive sign.

$$\Delta \phi_e = (2\pi/\lambda)(\Delta n_e \cdot dp + \Delta n_{ea} \cdot da) \quad (6)$$

where $\lambda$ is the wavelength of the light, and $\Delta n_{ea}$ is the difference between the refractive index $n_e$ of the substrate 40 with respect to the extraordinary light and the refractive index 1 of air with respect to the extraordinary light. $\Delta n_{ea}$ is expressed by equation (7).

$$\Delta n_{ea} = 1 - n_e \quad (7)$$

Thus, the polarization anisotropic holographic optical element 175 according to the present invention diffracts ordinary light but does not diffract extraordinary light. Such a function is achieved as follows.

The depth dp of the proton exchange layer 41 and the depth da of the grooves 42 are appropriately selected so that the phase difference $\Delta \phi_e$ of the extraordinary light (equation (6)) is a value obtained by multiplying $2\pi$ by an integer but that the phase difference $\Delta \phi_o$ of the ordinary light (equation (4)) is not a value obtained by multiplying $2\pi$ by an integer. The extinction ratio is maximum when $\Delta \phi_o$ is a value obtained by multiplying $\pi$ by an odd integer. Such conditions are expressed by equations (8) and (9).

$$(2\pi/\lambda)(\Delta n_o \cdot dp + \Delta n_{oa} \cdot da) = -(2n+1)\pi \quad (8)$$

$$(2\pi/\lambda)(\Delta n_e \cdot dp + \Delta n_{ea} \cdot da) = 2m\pi \quad (9)$$

Where n=0 and m=0, da and dp are expressed by equations (10) and (11).

$$da = (\lambda/2)\{\Delta n_e / (\Delta n_o \Delta n_{oe} - \Delta n_e \Delta n_{oe})\} \quad (10)$$

$$dp = (\lambda/2)\{\Delta n_{ea} / (\Delta n_o \Delta n_o - \Delta n_{ea} \Delta n_{ea})\} \quad (11)$$

From equations (10) and (11), an anisotropic holographic optical element used for, for example, light having a wavelength of 0.78 μm is formed by setting the depth da of the grooves 42 to be 0.25 μm and the depth dp of the proton exchange layer 41 to be 2.00 μm.

As is appreciated from the above description, by setting the polarization direction of the light beam 3 emitted from the light source 2 to be extraordinary with respect to the holographic optical element 175, unnecessary diffraction is avoided on the forward light path. On the backward light path, the polarization direction rotates by 90 degrees to become ordinary light, and thus diffraction occurs. By the diffracted light, servo signals are detected.

Accordingly, the light utilization efficiency is sufficiently high to obtain a satisfactory level of amplitude, and further a sufficiently high S/N ratio is obtained due to the substantial elimination of noise caused by unnecessary diffraction.

Further, by adjusting the diffraction efficiency of each order at the holographic optical element, the intensity of returning light to the light source can be freely controlled. For example, the intensity of returning light can be reduced to substantially zero by raising the efficiency of the plus first-order diffraction and the minus first-order diffraction on the backward light path and reducing the efficiency of the zero-order diffraction down to substantially zero. Accordingly, when a semiconductor laser is used as the light source 2, generation of noise caused by the returning light can be avoided.

The structure of the holographic optical element 175 is not limited to the one shown in FIG. 2. The holographic optical element 175 can be formed of, for example, a liquid crystal cell.

Such a structure is especially advantageous when adopted in an optical head device used for, for example, an optical disc having a higher density than that of compact discs which are now commercially available. Due to the reduction in the unnecessary diffraction to substantially zero, the quality of servo signals and an information signal is enhanced.

In this example, the holographic optical element 175 is provided in the vicinity of the objective lens 4, namely, far from the photodetectors 74a and 74b, the effective radius R1 of the holographic optical element 175 can be sufficiently large even in a finite optical system. Due to the sufficiently large effective radius R1, the positional tolerance of the holographic optical element 175 in assembling the optical head device 100 can be increased, thus reducing the assembly cost thereof.

Also in this example, the positional relationship among the holographic optical element 175, the quarter-wave plate 15, and the objective lens 4 is maintained by a supporting device 13 (FIG. 1). Due to such a structure, even if the objective lens 4 moves, for example, for tracking servo control, the holographic optical element 175 integrally moves. Thus, the light beam 3 reflected by the recording medium 5 does not substantially move on the holographic optical element 175. Accordingly, the outputs from the photodetectors 74a and 74b do not substantially deteriorate although the objective lens 4 moves.

The photodetectors 74a and 74b and the light source 2 in an example will be described with reference to FIG. 3.

As is shown in FIG. 3, the photodetectors 74a and 74b are provided on a substrate 74c. The substrate 74c has a receptacle 75 between the photodetectors 74a and 74b. A mirror 7a is provided on an inclined surface of the receptacle 75. The light source 2 is provided in the receptacle 75 to form a hybrid optical device.

Since the two detectors 74a and 74b are provided on one substrate 74c, the relative positions of the two detectors 74a and 74b can be set precisely to the order of, for example, micrometers with sufficient ease using a known fabrication process for an integrated circuit.

The hybrid optical device shown in FIG. 3 needs to be electrically connected to external devices through wires. Since such wires are connected on the x-y plane in FIG. 3, automatic assembly is easier.

Moreover, reference lines for assembly need to be provided only on the x-y plane, which further facilitates the precise setting of the relative positions of the photodetectors 74a and 74b and the light source 2.

Hereinafter, a pattern 150a of a hologram formed on the holographic optical element 175 will be described with reference to FIG. 4. The radial direction (R) in FIG. 4 corresponds to the radial direction of the recording medium 5 (perpendicular to lines of pits or tracks) and the tangential direction (T) corresponds to the direction parallel to the lines of pits. In the case where there is a certain distance between the hologram formed on the holographic optical element 175 and the objective lens 4 and a mirror is provided therebetween as will be described later, the radial and tangential directions in FIG. 4 denote coordinate axes in consideration of the images in the radial and tangential directions of the recording medium 5 formed by the mirror.

As is shown in FIG. 4, the hologram pattern 150a is divided into four areas by two straight lines which are substantially parallel to the radial direction and the tangential direction, respectively. The four diffraction areas each have at least one diffraction area (diffraction areas A through D).

Figure 5:
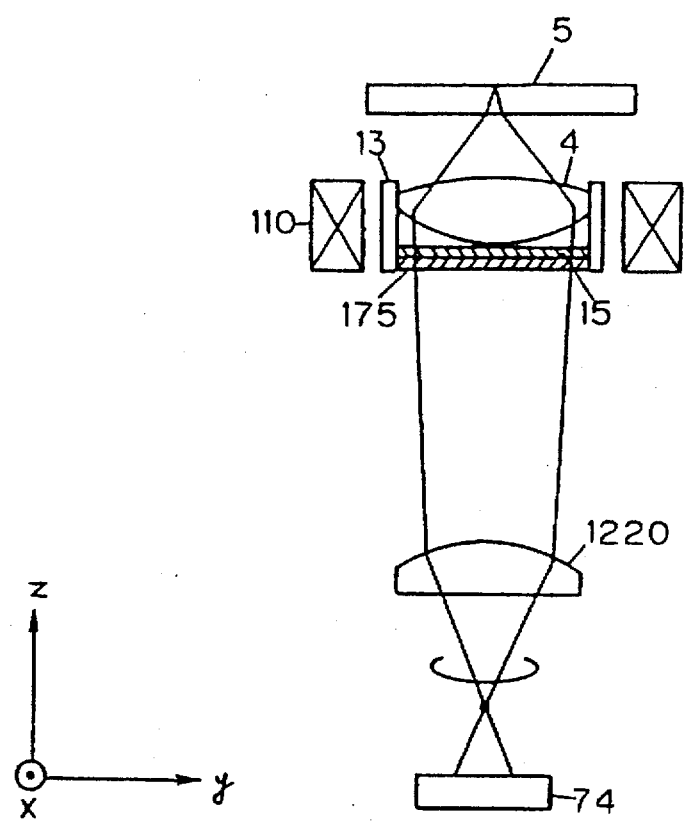
FIG. 5 is a schematic view illustrating a diffracted light beam having a focal point between the photodetector and the holographic optical element.
Figure 6:
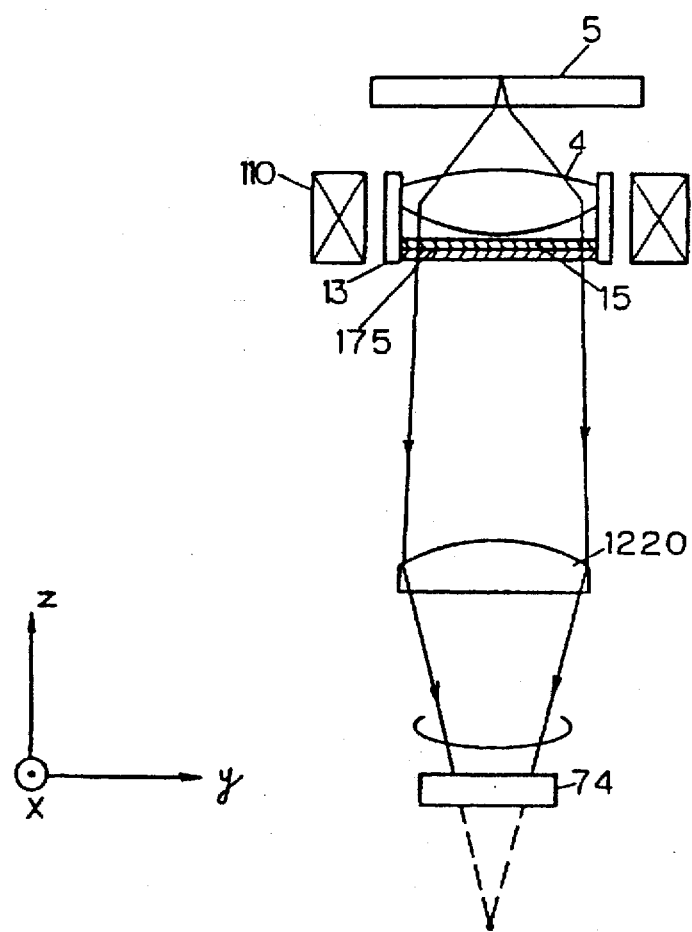
FIG. 6 is a schematic view illustrating a diffracted light beam having a focal point on the other side of the photodetector.

Each diffraction area is designed so as to generate at least two diffracted light beams as Nth-order diffracted light beams, for example, as plus first-order diffracted light beams. One of such diffracted light beams has a focal point between a light detection surface of the photodetector and the holographic optical element 175 (as is shown in FIG. 5; also described as "in front of the light detection surface" or "in front of photodetector"), and the other diffracted light beam has a focal point on the other side of the photodetector (as is shown in FIG. 6; also described as "behind the light detection surface" or "behind the photodetector"). The grating in each area of the holographic pattern can easily be designed by, for example, computing the interference fringes of desired diffracted light and the incident light. In FIGS. 5 and 6, the diffracted light beams are focused so as to form focal points, but can be focused so as to form focal lines extending parallel to a lane which divides a light detection surface of the photodetector used to obtain a focusing error signal (the x direction in FIGS. 5 and 6; described in detail later).

By the hologram pattern 150a, ±Nth-order diffracted light beams having focal points in front of the light detection surface and ±Nth-order diffracted light beams having focal points behind the light detection surface are both generated from substantially the entire surface of the holographic optical element 175. By obtaining the focusing error signal from either one of the plus Nth-order diffracted light beams or the minus Nth-order diffracted light beams and obtaining the tracking error signal from the other Nth-order diffracted light beams, the diffracted light beam for detecting the tracking error signal leaks into the detection area for detecting the focusing error signal, and thus a focusing error signal which is sufficiently stable with little noise can be obtained. The detection area for detecting the focusing error signal will be described in detail later.

Another pattern 150b of the hologram formed on the holographic optical element 175 will be described with reference to FIG. 7. The radial direction (R) in FIG. 7 corresponds to the radial direction of the recording medium 5, and the tangential direction (T) corresponds to the direction parallel to lines of pits. The radial direction and the tangential direction respectively correspond to the x and y directions. In the case where there is a certain distance between the hologram formed on the holographic optical element 175 and the objective lens 4 and a mirror is provided therebetween as will be described later, the radial and tangential directions in FIG. 4 denote coordinate axes in consideration of the images in the radial and tangential directions of the recording medium 5 formed by the mirror.

Figure 7:
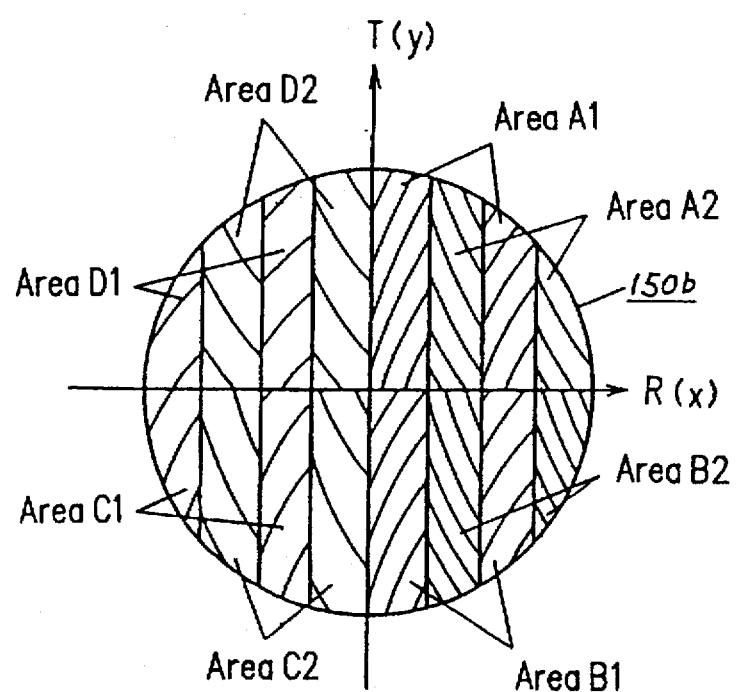
FIG. 7 is a plan view illustrating another hologram pattern according to the present invention.

As is shown in FIG. 7, the hologram pattern 150b is divided into four areas by two straight lines which are substantially parallel to the radial direction and the tangential direction, respectively. The four diffraction areas each have at least one diffraction area (diffraction areas A through D). Each area is further divided into two sub-areas (sub-areas A1 and A2 in the case of the diffraction area A).

One of the sub-areas of each diffraction area is designed so as to generate a diffracted light beam having a focal point in front of the light detection so surface as a plus Nth-order diffracted light beam, for example, a plus first-order diffracted light beam. The other sub-area is designed so as to generate a diffracted light beam having a focal point behind the light detection surface as a plus Nth-order diffracted light beam.

In the hologram pattern 150b, only one type of grating is formed in one sub-area. Accordingly, unnecessary diffraction due to interference between gratings is eliminated, which reduces stray light and noise and raises the light utilization efficiency.

Hereinafter, an example of the photodetectors 74a and 74b will be described with reference to FIG. 8. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N=1.

Figure 8:
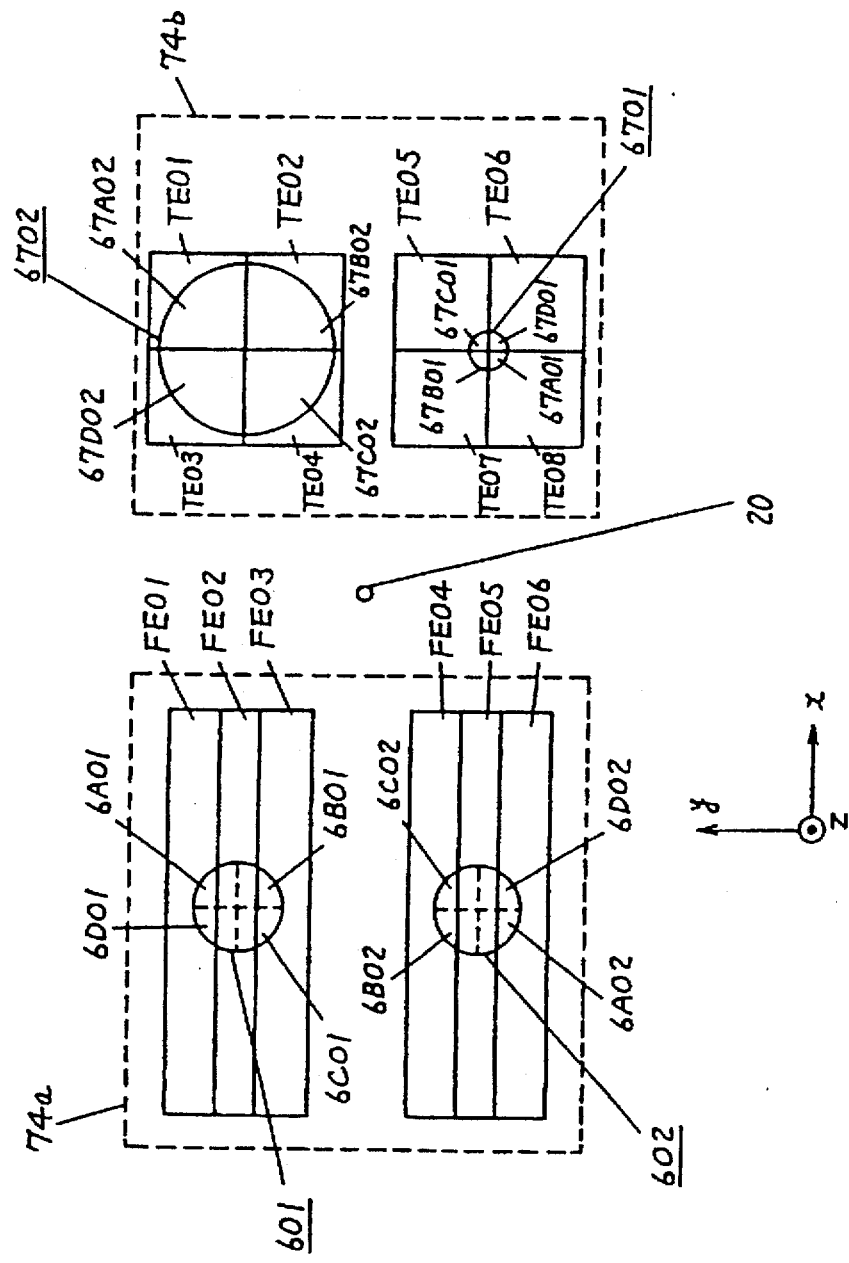
FIG. 8 is a schematic view illustrating photodetectors in an example according to the present invention.

The photodetector 74a is used for detecting a focusing error signal and includes detection areas FE01 through FE06, as is shown in FIG. 8. The photodetector 74b is used for detecting a tracking error signal and includes detection areas TE01 through TE08. Each detection area outputs a signal in accordance with the amount of light incident thereon.

Plus first-order diffracted light beams 6A01 through 6D01, which are incident on the detection areas FE01 through FE03, are respectively generated by the diffraction areas A through D of the holographic optical element 175 and have focal points behind the photodetector 74a. Plus first-order diffracted light beams 6A01 through 6D02, which are incident on the detection areas FE04 through FE06, are respectively generated by the diffraction areas A through D of the holographic optical element 175 and have focal points in front of the photodetector 74a.

In this example, either the hologram pattern 150a or 150b can be used. The diffraction areas A through D are continuous and not actually divided. In other words, in this example, the lines dividing the hologram pattern shown in FIGS. 4 and 7 are imaginary and used merely for explanation. Accordingly, the plum first-order diffracted light beams 6A01 through 6D01 form together a plus first-order diffracted light beam 601; and the plus first-order diffracted light beams 6A02 through 6D02 form together a plus first-order diffracted light beam 602.

The x, y and z axes are the same as the those shown in FIG. 1. The z axis substantially corresponds with the center axis of the light emitted from the light source 2. The x and y axes are on a light detection surface which is substantially perpendicular to the z axis. The x direction substantially corresponds with the direction from the center of gravity of the shape of the plus first-order diffracted light beam 601 and the plus first-order diffracted light beam 602 (in the state where the light spot on the recording medium 5 is in focus) to the light emitting point 20 of the light source 2 projected on the light detection surface. The direction of the y axis is perpendicular to the z axis and the x axis.

Minus first-order diffracted light beams 67A01 through 67D01, which irradiate the detection areas TE01 through TE04, are respectively conjugate waves of the plus first-order diffracted light beams 6A01 through 6D01. The minus first-order diffracted light beams 67A01 through 67D01 each have a focal point in front of the photodetector 74b. The minus first-order diffracted light beams 67A02 through 67D02, which are respectively conjugate waves of the plus first-order diffracted light beams 6A02 through 6D02, each have a focal point behind the photodetector 74b. The minus first-order diffracted light beams 67A01 through 67D01 form together a minus first-order diffracted light beam 6701; and the minus first-order diffracted light beams 67A02 through 67D02 form together a minus first-order diffracted light beam 6702.

In the case where the photodetectors 74a and 74b and the light source 2 are integrally structured as a hybrid optical device as is shown in FIG. 3, a light emitting point 20 or an image of the light emitting point as is shown in FIG. 8 of the light source 2 is behind the light detection surface (on the side of minus Z in FIG. 8). Accordingly, when the light spot is in focus on the recording medium 5, the spot of the plus first-order diffracted light beam 601 and the spot of the plus first-order diffracted light beam 602 have approximately the same size, while the spot of the minus first-order diffracted light beam 6701 is smaller than that of the minus first-order diffracted light beam 6702.

Hereinafter, a method for detecting a focusing error signal using the plus first-order diffracted light beams will be described. In this example, the focusing error signal is obtained using a spot size detection (SSD) method. As is described in Japanese Laid-Open Patent Publication No. 2-185722, the SSD method significantly increases the tolerance for assembling the optical head device 100 and detects servo signals stably against a fluctuation in the wavelength of the light.

Figure 9A:
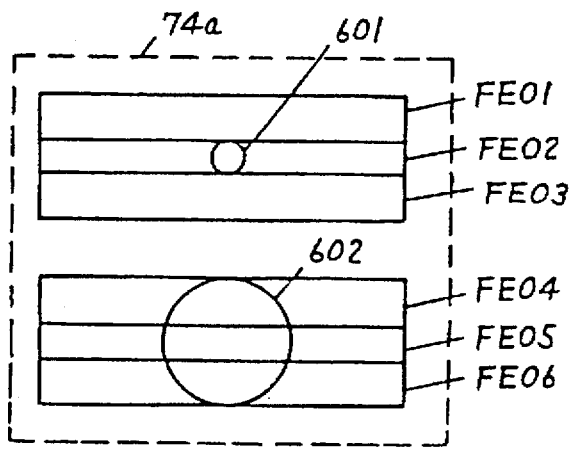
FIG. 9A is a view illustrating spots of diffracted light beams on the photodetector in the state of being defocused.
Figure 9B:
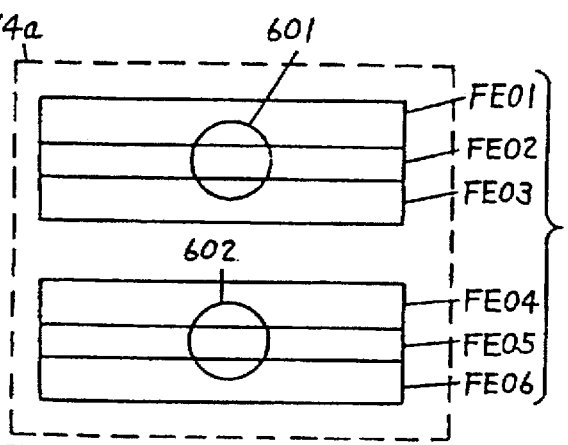
FIG. 9B is a view illustrating spots of diffracted light beams on the photodetector in the state of being focused.
Figure 9C:
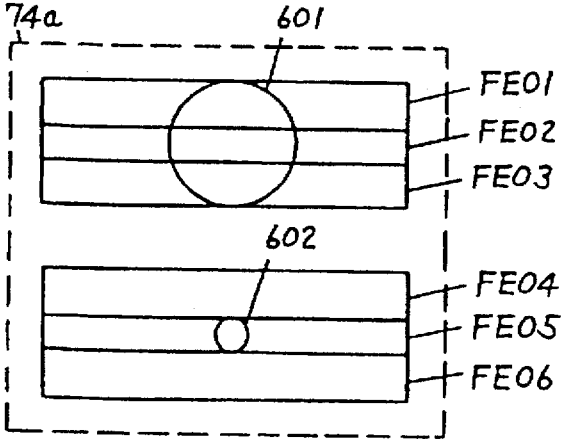
FIG. 9C is a view illustrating spots of diffracted light beams on the photodetector in the state of being defocused.

In the SSD method, diffracted light beams having focal points in front of and behind a reference surface are used. Such diffracted light beams are generated by an optical device, such as an off-axis fresnel zone plate or interference fringes of two spherical waves having different focal points. The diffracted light beams on the photodetector 74a are, for example, as is shown in FIGS. 9A, 9B and 9C, FIGS. 9A and 9C show the diffracted light beams where a light beam directed onto the recording medium is out of focus, and FIG. 9B shows the diffracted light beams where a light beam is directed onto the recording medium is in focus. A focusing error signal FE is expressed by equation (12).

$$FE=(FE01+FE03-FE02)-(FE04+FE06-FE05) \quad (12)$$

In the case where the relative positions of the holographic optical element 175, the quarter-wave plate 15 and the objective lens 4 are supported by the supporting device 13 as described above, even if the objective lens 4 moves, for example, for tracking control, the holographic optical element 175 also moves integrally. Thus, the light beam 3 reflected by the recording medium 5 does not substantially move on the holographic optical element 175. Accordingly, the diffracted light beams on the photodetectors 74a and 74b do not move although the objective lens 4 moves, and thus the output signals from the photodetectors 74a and 74b do not substantially deteriorate. Therefore, a focusing error signal FE can be detected stably.

Returning to FIG. 8, a method for detecting a tracking error signal TE will be described.

The y direction is the tangential direction, namely, the direction of tracks of the recording medium 5. Then, two signals changing over time are obtained by equations (13) and (14).

$$TE1=TE01+TE04+TE05+TE08 \quad (13)$$

$$TE2=TE02+TE03+TE06+TE07 \quad (14)$$

A tracking error signal is obtained by comparing the phases of the signals TE1 and TE2. Such a method of obtaining a tracking error signal by comparing the phases of the signals, which is also described in Japanese Laid-Open Patent Publication No. 4-40634, is referred to as the "phase difference method". The phase difference is detected by various methods. For example, a sum signal of signals TE1 and TE2 is offset by 90 degrees and the resultant signal is multiplied by a difference signal indicating the difference between the signals TE1 and TE2 (heterodyne method); the signals TE1 and TE2 are digitized and the phases thereof are compared; or the signals TE1 and TE2 are sampled and held. In this example, any method can be used.

In this example, a push-pull method can also be used to obtain a tracking error signal by equation (15).

$$TE=(TE01+TE02-TE0-TE04)-(TE05+TE06-TE07+TE08) \quad (15)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

In this example, the plus first-order diffracted light beam can be used substantially entirely to obtain a focusing error signal. Accordingly, the obtained focusing error signal has a sufficiently large amplitude and a sufficiently high S/N ratio. For the same reason, the diffracted light beam for detecting a focusing error signal has a uniform intensity in the y direction. As a result, the resultant focusing error signal has a satisfactory level of sensitivity.

Also in this example, the minus first-order diffracted light beam can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

An information signal RF can be obtained with sufficient ease using equation (16) or (17), or the sum of equations (16) and (17).

$$RF=TE01+TE02+TE03+TE04+TE05+TE06+TE07+TE08 \quad (16)$$

$$RF=FE01+FE02+FE03+FE04+FE05+FE06 \quad (17)$$

EXAMPLE 2

The photodetectors 74a and 74b in another example according to the present invention will be described with reference to FIG. 10. In this example, the pattern of the diffracted light beams radiated to the photodetectors 74a and 74b is different from that in the first example. The optical head device 100 in this example has the same structure as that in the first example except for the above-mentioned point, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N=1.

Figure 10:
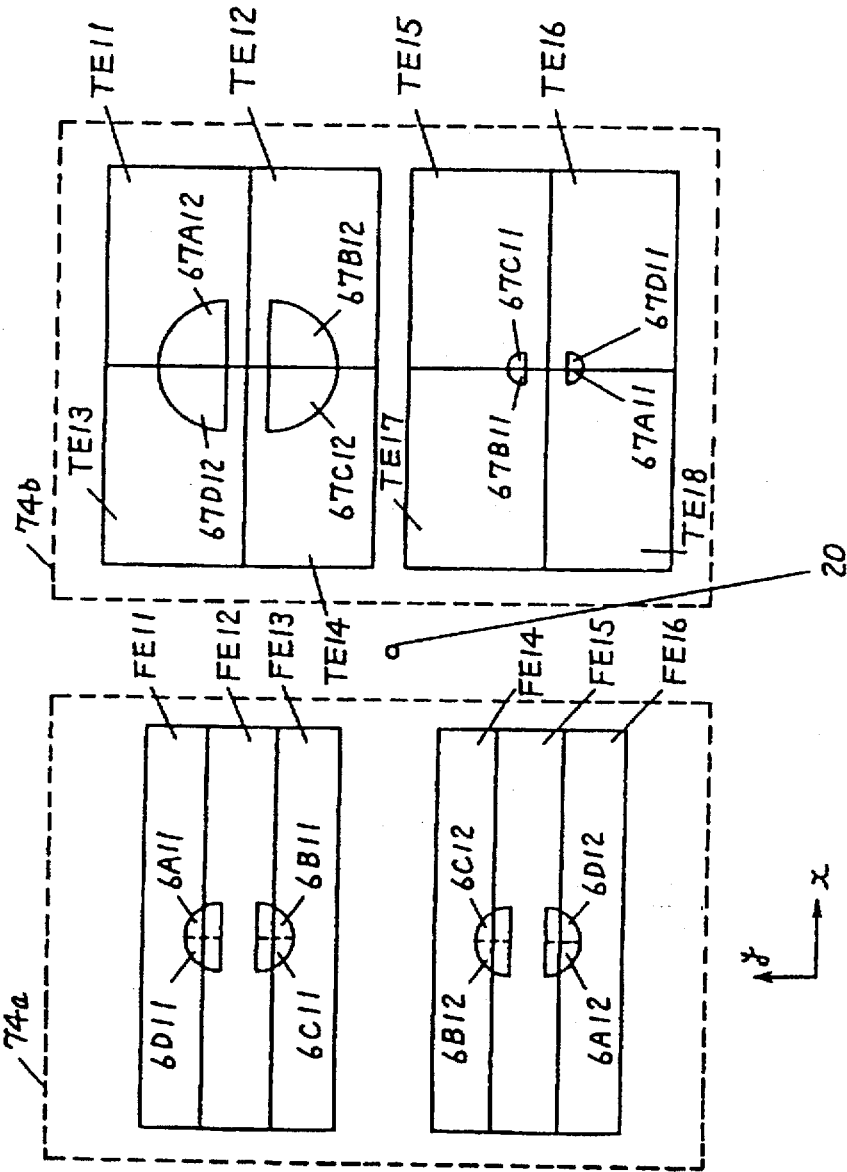
FIG. 10 is a schematic view illustrating photodetectors in another example according to the present invention.

The photodetector 74a is used for detecting a focusing error signal and includes detection areas FE11 through FE16 as is shown in FIG. 10. The photodetector 74b is used for detecting a tracking error signal and includes detection areas TE11 through TE18. Each detection area outputs a signal in accordance with the amount of light incident thereon.

Plus first-order diffracted light beams 6A11 through 6D11, which are incident on the detection areas FE11 through FE13, are respectively generated by the diffraction areas A through D of the holographic optical element 175 and have focal points behind the photodetector 74a. Plus first-order diffracted light beams 6A12 through 6D12, which are incident on the detection areas FE14 through FE16, are respectively generated by the diffraction areas A through D of the holographic optical element 175 and have focal points in front of the photodetector 74a. In this example, the diffraction areas A and D are continuous, and the diffraction areas B and C are continuous. That is, the hologram pattern 150a (or 150b) is divided into at least two.

Minus first-order diffracted light beams 67A11 through 67D11, which irradiate the detection areas TE18, TE17, TE15 and TE16, are respectively conjugate waves of the plus first-order diffracted light beams 6A11 through 6D11 and each have a focal point an front of the photodetector 74b. Minus first-order diffracted light beams 67A12 through 67D12, which are respectively conjugate waves of the plus first-order diffracted light beams 6A12 through 6D12, each have a focal point behind the photodetector 74b.

In this example, when the light spot is in focus on the recording medium 5, the plus first-order diffracted light beams 6A11 and 6D11 are separated from the plus first-order diffracted light beams 6B11 and 6C11 in the y direction, and the plus first-order diffracted light beams 6A12 and 6D12 are separated from the plus first-order diffracted light beams 6B12 and 6C12 in the y direction.

Accordingly, when the light spot is in focus on the recording medium 5, the minus first-order diffracted light beams 67A11 and 67D11 are also separated from the minus first-order diffracted light beams 67B11 and 67C11 in the y direction, and the minus first-order diffracted light beams 67A12 and 67D12 are separated from the minus first-order diffracted light beams 67B12 and 67C12 in the y direction.

Due to such positional relationships between the diffracted light beams, the minus first-order diffracted light remains within a desired area in the photodetector 74b even if the light emitting point 20 is offset in the y direction with respect to the photodetector 74b. Thus, the tolerance in assembling the optical head device 100 is increased and thus the assembly cost is reduced.

Especially in the case where the photodetectors 74a and 74b and the light source 2 are integrally structured as is shown in FIG. 3, if the light emitting point 20 of the light source 2 is offset in the y direction with respect to the photodetectors 74a and 74b, the relative positions of the plus first-order diffracted light beams and the photodetector 74a need to be adjusted by relatively rotating the holographic optical element 175 and the photodetectors 74a and 74b around the z axis, in order to obtain a satisfactory focusing error signal.

By such adjustment, the offset amount of the minus first-order diffracted light with respect to the photodetector 74b increases. However, since the minus first-order diffracted light beams 67A12 and 67D12 are separated from the minus first-order diffracted light beams 67B12 and 67C12 in the y direction, the minus first-order diffracted light remains within a desired area of the photodetector 74b. Due to such a structure, the positional tolerance of the light emitting point 20 with respect to the photodetectors 74a and 74b increases, and thus the assembly cost is reduced.

A focusing error signal and a tracking error signal can be obtained in the same manner as in the previous examples.

A focusing error signal FE is expressed by equation (18).

$$(FE11+FE13-FE12)-(FE14+FE16-FE15) \quad (18)$$

A tracking error signal TE is obtained by the phase difference method, that is, by first obtaining two signals TE1 and TE2 changing over time using equations (19) and (20) and then comparing the phases of the signals TE1 and TE2.

$$TE1=TE11+TE14+TE15+TE18 \quad (19)$$

$$TE2=TE12+TE13+TE16+TE17 \quad (20)$$

A tracking error signal TE can be obtained by equation (21) by the push-pull method.

$$TE=(TE11+TE12-TE13-TE14)-(TE15+TE16-TE17+TE18) \quad (21)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

In this example, the plus first-order diffracted light beams can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have a uniform intensity in the y direction. As a result, the resultant focusing error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

An information signal RF can be obtained with sufficient ease using equation (22) or (23), or the sum of equations (22) and (23).

$$RF=TE11+TE12+TE13+TE14+TE15+TE16+TE17+TE18 \quad (22)$$

$$RF=FE11+FE12+FE13+FE14+FE15+FE16 \quad (23)$$

EXAMPLE 3

The photodetectors 74a and 74b in still another example according to the present invention will be described with reference to FIG. 11. In this example, the pattern of the diffracted light beams radiated to the photodetectors 74a and 74b is different from that in the first example. The optical head device 100 in this example has the same structure as that in the first example except for the above-mentioned point, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N=1.

Figure 11:
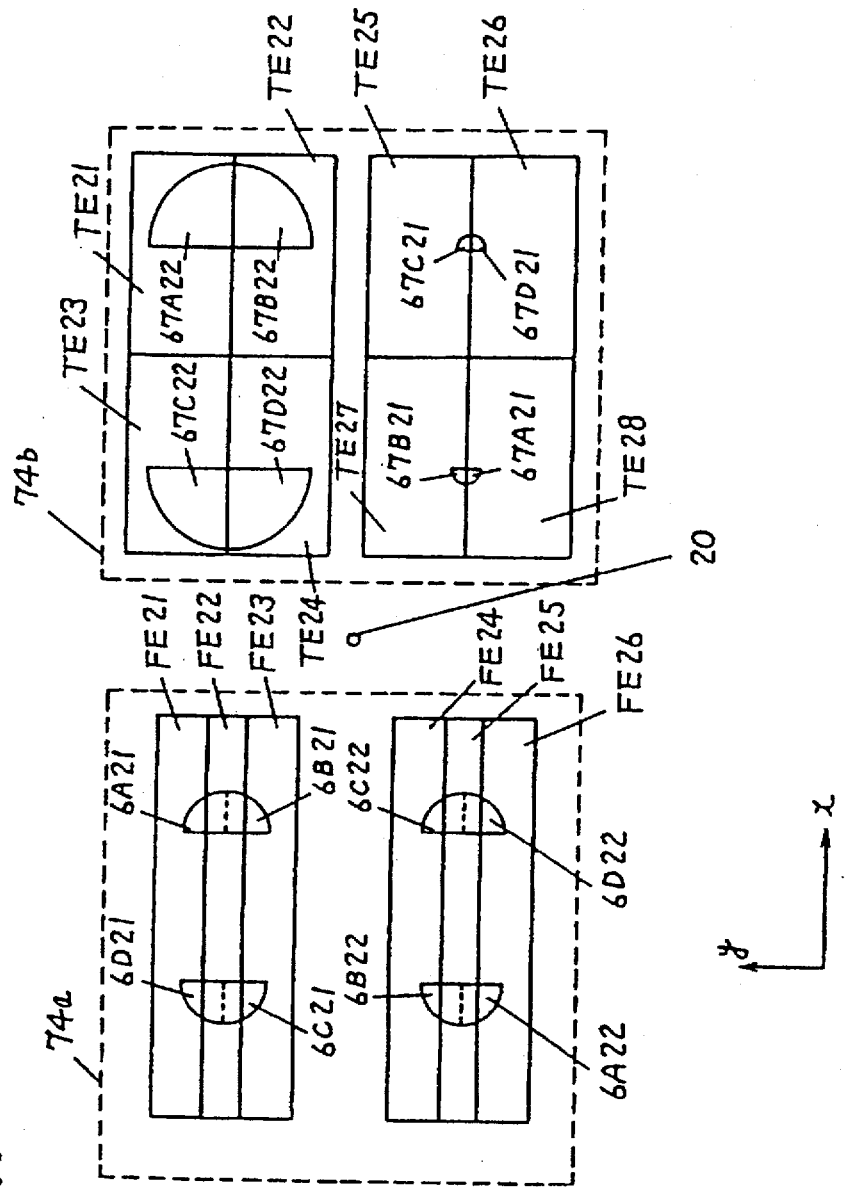
FIG. 11 is a schematic view illustrating photodetectors in still another example according to the present invention.

The photodetector 74a is used for detecting a focusing error signal and includes detection areas FE21 through FE26 as is shown in FIG. 11. The photodetector 74b is used for detecting a tracking error signal and includes detection areas TE21 through TE28. Each detection area outputs a signal in accordance with the amount of light incident thereon.

Plus first-order diffracted light beams 6A21 through 6D21, which are incident on the detection areas FE21 through FE23, are respectively generated by the diffraction areas A through D of the holographic optical element 175 and have focal points behind the photodetector 74a. Plus first-order diffracted light beams 6A22 through 6D22, which are incident on the detection areas FE24 through FE26, are respectively generated by the diffraction areas A through D of the holographic optical element 175 and have focal points in front of the photodetector 74a. In this example, the diffraction areas A and B are continuous, and the diffraction areas C and D are continuous. That is, the hologram pattern 150a (or 150b) is divided into at least two.

Minus first-order diffracted light beams 67A21 through 67D21, which irradiate the detection areas TE28, TE27, TE25 and TE26, are respectively conjugate waves of the plus first-order diffracted light beams 6A21 through 6D21, and each have a focal point in front of the photodetector 74b. Minus first-order diffracted light beams 67A22 through 67D22, which are respectively conjugate waves of the plus first-order diffracted light beams 6A22 through 6D22, each have a focal point behind the photodetector 74b.

In this example, when the light spot is in focus on the recording medium 5, the plus first-order diffracted light beams 6A21 and 6B21 are separated from the plus first-order diffracted light beams 6C21 and 6D21 in the x direction, and the plus first-order diffracted light beams 6A22 and 6B22 are separated from the plus first-order diffracted light beams 6C22 and 6D22 in the x direction.

Accordingly, when the light spot is in focus on the recording medium 5, the minus first-order diffracted light beams 67A21 and 67B21 are also separated from the minus first-order diffracted light beams 67C21 and 67D21 in the x direction, and the minus first-order diffracted light beams 67A22 and 67B22 are separated from the minus first-order diffracted light beams 67C22 and 67D22 in the x direction.

Due to such positional relationships between the diffracted light beams, the minus first-order diffracted light remains within a desired area in the photodetector 74b even if the light emitting point 20 is offset in the x direction with respect to the photodetector 74b. Thus, the tolerance in assembling the optical head device 100 is increased and thus the assembly cost is reduced.

If the wavelength of the light emitted by the light source 2 is different from a designed value, the diffracted light moves in the x direction. However, since the minus first-order diffracted light remains within the desired area of the photodetector 74b, a stable tracking error signal can be obtained.

Especially in the case where the photodetectors 74a and 74b and the light source 2 are integrally structured as a hybrid optical device as is shown in FIG. 3, even if the light emitting point 20 of the light source 2 is offset in the x direction with respect to the photodetectors 74a and 74b, a satisfactory focusing error signal and a satisfactory tracking error signal can be obtained. Accordingly, the positional tolerance of the light emitting point 20 with respect to the photodetectors 74a and 74b increases, and thus the assembly cost is reduced.

A focusing error signal and a tracking error signal can be obtained in the same manner as in the previous examples.

A focusing error signal FE is expressed by equation (24).

$$FE=(FE21+FE23-FE22)-(FE24+FE25-FE25) \quad (24)$$

A tracking error signal TS is obtained by the phase difference method, that is, by first obtaining two signals TE1 and TE2 changing over time using equations (25) and (26) and then comparing the phases of the signals TE1 and TE2.

$$TE1=TE21+TE24+TE25+TE28 \quad (25)$$

$$TE2=TE22+TE23+TE26+TE27 \quad (26)$$

A tracking error signal TE can be obtained by equation (27) by the push-pull method.

$$TE=(TE21+TE22-TE23-TE24)-(TE25+TE26-TE27+TE28) \quad (27)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

In this example, the plus first-order diffracted light beams can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have a uniform intensity in the y direction. As a result, the resultant focusing error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

An information signal RF can be obtained with sufficient ease using equation (28) or (29), or the sum of equations (28) and (29).

$$RF=TE21+TE22+TE23+TE24+TE25+TE26+TE27+TE28 \quad (28)$$

$$RF=FE21+FE22+FE23+FE24+FE25+FE26 \quad (29)$$

EXAMPLE 4

The photodetectors 74a and 74b in still another example according to the present invention will be described with reference to FIG. 12. In this example, the pattern of the diffracted light beams radiated to the photodetectors 74a and 74b is different from that in the first example. The optical head device 100 in this example has the same structure as that in the first example except for the above-mentioned point, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N=1.

Figure 12:
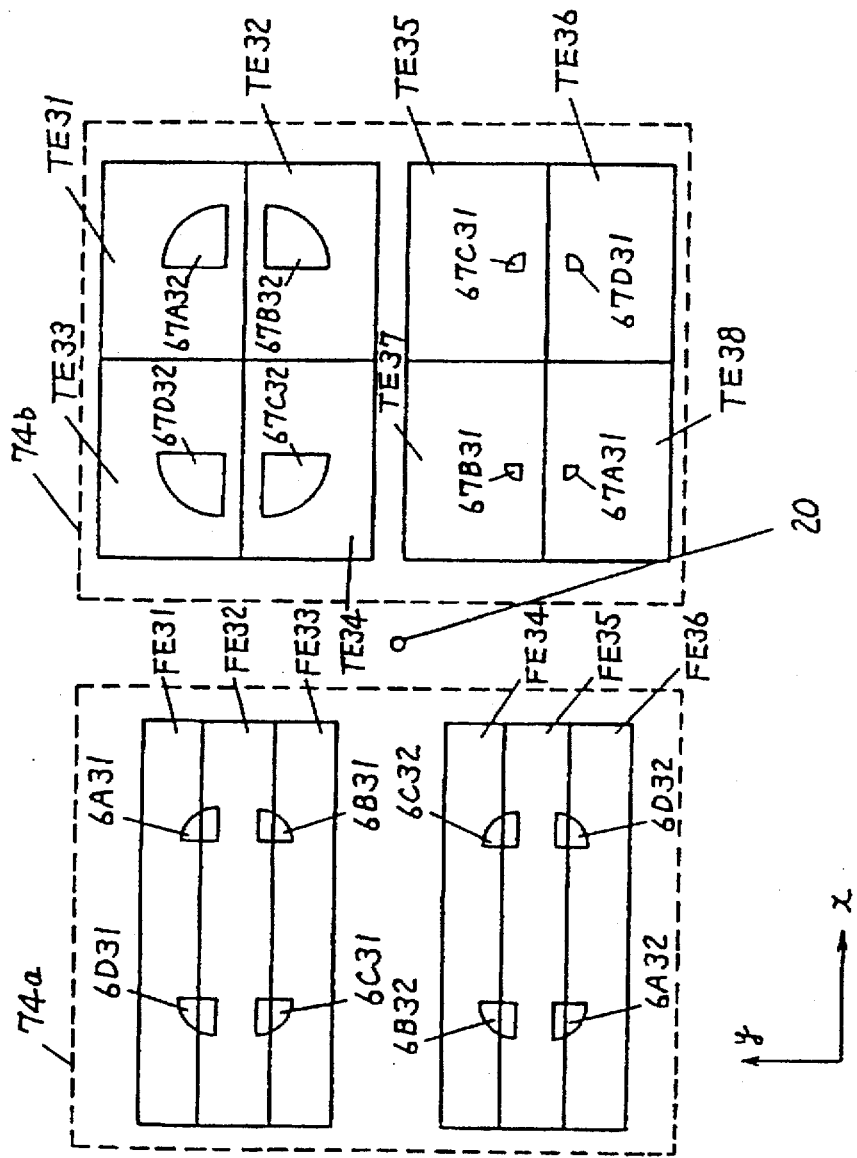
FIG. 12 is a schematic view illustrating photodetectors in still another example according to the present invention.

The photodetector 74a is used for detecting a focusing error signal and includes detection areas FE31 through FE36 as is shown in FIG. 12. The photodetector 74b is used for detecting a tracking error signal and includes detection areas TE31 through TE38. Each detection area outputs a signal in accordance with the amount of light incident thereon.

Plus first-order diffracted light beams 6A31 through 6D31, which are incident on the detection areas FE31 through FE33, are respectively generated by the diffraction areas A through D of the holographic optical element 175 and have focal points behind the photodetector 74a. Plus first-order diffracted light beams 6A32 through 6D32, which are incident on the detection areas FE34 through FE36, are respectively generated by the diffraction areas A through D of the holographic optical element 175 and have a focal point in front of the photodetector 74a. In this example, the hologram pattern 150a (or 150b) is divided into at least four parts.

Minus first-order diffracted light beams 67A31 through 67D31, which irradiate the detection areas TE38, TE37, TE35 and TE36, are respectively conjugate waves of the plus first-order diffracted light beams 6A31 through 6D31, and light beams 67A31 through 67D31 each have a focal point in front of the photodetector 74b. Minus first-order diffracted light beams 67A32 through 67D32, which are respectively conjugate waves of the plus first-order diffracted light beams 6A32 through 6D32, each have a focal point behind the photodetector 74b.

In this example, when the light spot is in focus on the recording medium 5, the plus first-order diffracted light beams 6A31 and 6B31 are separated from the plus first-order diffracted light beams 6C31 and 6D31 in the x direction; the plus first-order diffracted light beams 6A32 and 6B32 are separated from the plus first-order diffracted light beams 6C32 and 6D32 in the x direction; the plus first-order diffracted light beams 6A31 and 6D31 are separated from the plus first-order diffracted light beams 6B31 and 6C31 in the y direction; and the plus first-order diffracted light beams 6A32 and 6D32 are separated from the plus first-order diffracted light beams 6B32 and 6C32 in the y direction.

Accordingly, when the light spot is in focus on the recording medium 5, the minus first-order diffracted light beams 67A31 and 67B31 are also separated from the minus first-order diffracted light beams 67C31 and 67D31 in the x direction; the minus first-order diffracted light beams 67A32 and 67B32 are separated from the minus first-order diffracted light beams 67C32 and 67D32 in the x direction; the minus first-order diffracted light beams 67A31 and 67D31 are also separated from the minus first-order diffracted light beams 67B31 and 67C31 in the y direction; and the minus first-order diffracted light beams 67A32 and 67D32 are separated from the minus first-order diffracted light beams 67B32 and 67C32 in the y direction.

Due to such positional relationships between the diffracted light beams, the minus first-order diffracted light remains within a desired area in the photodetector. 74b even if the light emitting point 20 is offset in the x direction with respect to the photodetector 74b. Thus, the tolerance in assembling the optical head device 100 is increased and thus the assembly cost is reduced.

If the wavelength of the light emitted by the light source 2 is different from a designed value, the diffracted light moves in the x direction. However, since the minus first-order diffracted light remains within the desired area of the photodetector 74b, a stable tracking error signal can be obtained.

Especially in the case where the photodetectors 74a and 74b and the light source 2 are integrally structured as a hybrid optical device as is shown in FIG. 3, even if the light emitting point 20 of the light source 2 is offset in the x direction with respect to the photodetectors 74a and 74b, a satisfactory focusing error signal and a satisfactory tracking signal can be obtained. Accordingly, the positional tolerance of the light emitting point 20 with respect to the photodetectors 74a and 74b increases, and thus the assembly cost is reduced.

Especially in the case where the photodetectors 74a and 74b and the light source 2 are integrally structured as a hybrid optical device as is shown in FIG. 3, if the light emitting point 20 of the light source 2 is offset in the y direction with respect to the photodetectors 74a and 74b, the relative positions of the plus first-order diffracted light and the photodetector 74a need to be adjusted by relatively rotating the holographic optical element 175 and the photodetectors 74a and 74b around the z axis, in order to obtain a satisfactory focusing error signal.

By such adjustment, the offset amount of the minus first-order diffracted light with respect to the photodetector 74b increases. However, since the minus first-order diffracted light beams 67A32 and 67D32 are separated from the minus first-order diffracted light beams 67B32 end 67C32 in the y direction, the minus first-order diffracted light remains within the desired area of the photodetector 74b. Due to such a structure, the positional tolerance of the light emitting point 20 with respect to the photodetectors 74a and 74b increases, and thus the assembly cost is reduced.

A focusing error signal and a tracking error signal can be obtained in the same manner as in the previous examples.

A focusing error signal FE is expressed by equation (30).

$$FE=(FE31+FE33-FE32)-(FE34+FE36-FE35) \quad (30)$$

A tracking error signal TE is obtained by the phase difference method, that is, by first obtaining two signals TE1 and TE2 changing over time using equations (31) and (32) and then comparing the phases of the signals TE1 and TE2.

$$TE1=TE31+TE34+TE35+TE38 \quad (31)$$

$$TE2=TE32+TE33+TE36+TE37 \quad (32)$$

A tracking error signal TE can be obtained by equation (33) by the push-pull method.

$$TE=(TE31+TE32-TE33-TE34)-(TE35+TE36-TE37+TE38) \quad (33)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b:

one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

In this example, the plus first-order diffracted light bases can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have in a uniform intensity in the y direction. As a result, the resultant tracking error signal has a satisfactory level of sensitivity.

Also in this example, the minus first-order diffracted light beams can be used substantially entirely To obtain a tracking error signal. Accordingly, the obtained tracking error signal has a sufficiently large amplitude and a sufficiently high S/N ratio. For the same reason, stable signal detection is performed even if the recording medium is scratched.

An information signal RF can be obtained with sufficient ease using equation (34) or (35), or the sum of equations (34) and (35).

$$RF=TE31+TE32+TE33+TE34+TE35+TE36+TE37+TE38 \quad (34)$$

$$RF=FE31+FE32+TE33+TE34+TE35+TE36 \quad (35)$$

EXAMPLE 5

The photodetectors 74a and 74b in still another example according to the present invention will be described with reference to FIG. 13. In this example, the structure of the photodetectors 74a and 74b and the pattern of the diffracted light beams radiated to the photodetectors 74a and 74b are different from those in the first example. The optical head device 100 in this example has the same structure as that in the first example except for the above-mentioned points, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N–1.

Figure 13:
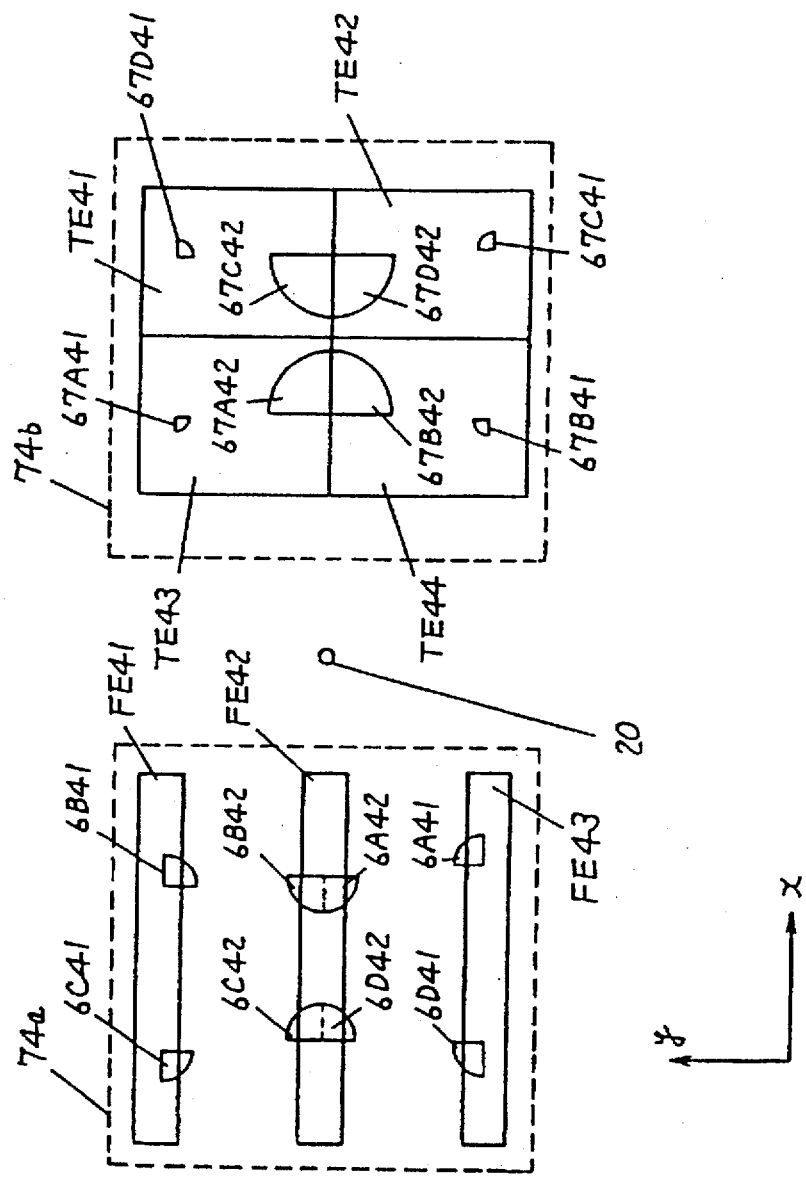
FIG. 13 is a schematic view illustrating photodetectors in still another example according to the present invention.

The photodetector 74a is user for detecting a focusing error signal and includes detection areas FE41 through FE43 as is shown in FIG. 13. The photodetector 74b is used for detecting a tracking error signal and includes detection areas TE41 through TE44. Each detection area outputs a signal in accordance with the amount of light incident thereon.

Plus first-order diffracted light beams 6A41 through 6D41, which are incident on the detection areas FE41 and FE43, are respectively generated by the diffraction areas A through D of the holographic optical element 175 and have focal points behind the photodetector 74a. Plus first-order diffracted light beams 6A42 through 6D42, which are incident on the detection area FE42, are respectively generated by the diffraction areas A through D of the holographic optical element 175 and have focal points in front of the photodetector 74a.

Minus first-order diffracted light beams 67A41 through 67D41, which irradiate the detection areas TE43, TE44, TE42 and TE41, are respectively conjugate waves of the plus first-order diffracted light beams 6A41 through 6D41 and the light beams 67A41 through 67D41 each have a focal point in front of the photodetector 74b. Minus first-order diffracted light beams 67A42 through 67D42, which are respectively conjugate waves of the plus first-order diffracted light beams 6A42 through 6D42, each have a focal point behind the photodetector 74b.

In this example, when the light spot is in focus on the recording medium 5, a plus first-order diffracted light beam having a focal point in front of the photodetector which is generated from a diffraction area is closest to the plus first-order diffracted light beam having a focal point behind the photodetector which is generated by the same diffraction area. For instance, the plus first-order diffracted light beams 6A41 having a focal point behind the photodetector 74a is closest to the plus first-order diffracted light 6A42 having a focal point in front of the photodetector 74a when the light spot is in focus on the recording medium 5.

Minus first-order diffracted light beams which are conjugate with the plus first-order diffracted light beams are positioned in the same manner. For example, a minus first-order diffracted light beam 67A41 having a focal point in front of the photodetector 74b is closest to a minus first-order diffracted light beam 67A42 when the light spot is in focus on the recording medium 5.

A focusing error signal and a tracking error signal can be obtained in the same manner as in the previous examples.

A focusing error signal FE is expressed by equation (36).

$$FE=(FE41+FE43-FE42) \quad (36)$$

A tracking error signal TE is obtained by the phase difference method, that is, by first obtaining two signals TE1 and TE2 changing over time using equations (37) and (38) and then comparing the phases of the signals TE1 and TE2.

$$TE1=TE41+TE43 \quad (37)$$

$$TE2=TE42+TE44 \quad (38)$$

A tracking error signal can be obtained by equation (39) by the push-pull method.

$$TE=(TE41+TE42)-(TE43+TE44) \quad (39)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

Since the number of detection areas in the photodetector is less in this example, a lesser number of connection routes are required between the photodetector and a computation circuit. Accordingly, the number of steps of connection is decreased, which reduces the production cost. The detectors 74a and 74b can be reduced in size due to a lesser number of connection areas with external devices, and thus the size of the optical head device 100 is also reduced.

In this example, the plus first-order diffracted light beams can be used substantially entirely to obtain a focusing error signal. Accordingly, the obtained focusing error signal has a sufficiently large amplitude and a sufficiently high S/N ratio. For The same reason, the diffracted light beams for detecting a focusing error signal have a uniform intensity in the y direction. As e result, the resultant tracking error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

If the wavelength of the light emitted by the light source 2 is different from a designed value, the diffracted light moves in the x direction. However, since the minus first-order diffracted light remains within a desired area of the photodetector 74b, a stable tracking error signal can be obtained.

An information signal RF can be obtained with sufficient ease using, for example, equation (40).

$$RF = TE41 + TE42 + TE43 + TE44 \quad (40)$$

EXAMPLE 6

The photodetectors 74a and 74b in still another example according to the present invention will be described with reference to FIG. 14. In this example, the structure of the photodetectors 74a and 74b and the pattern of the diffracted light beams radiated to the photodetectors 74a and 74b are different from those in the first example. The optical head device 100 in this example has the same structure as that in the first example except for the above-mentioned points, and the description thereof will be omitted. In this example, the optical heed device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example. N=1.

Figure 14:
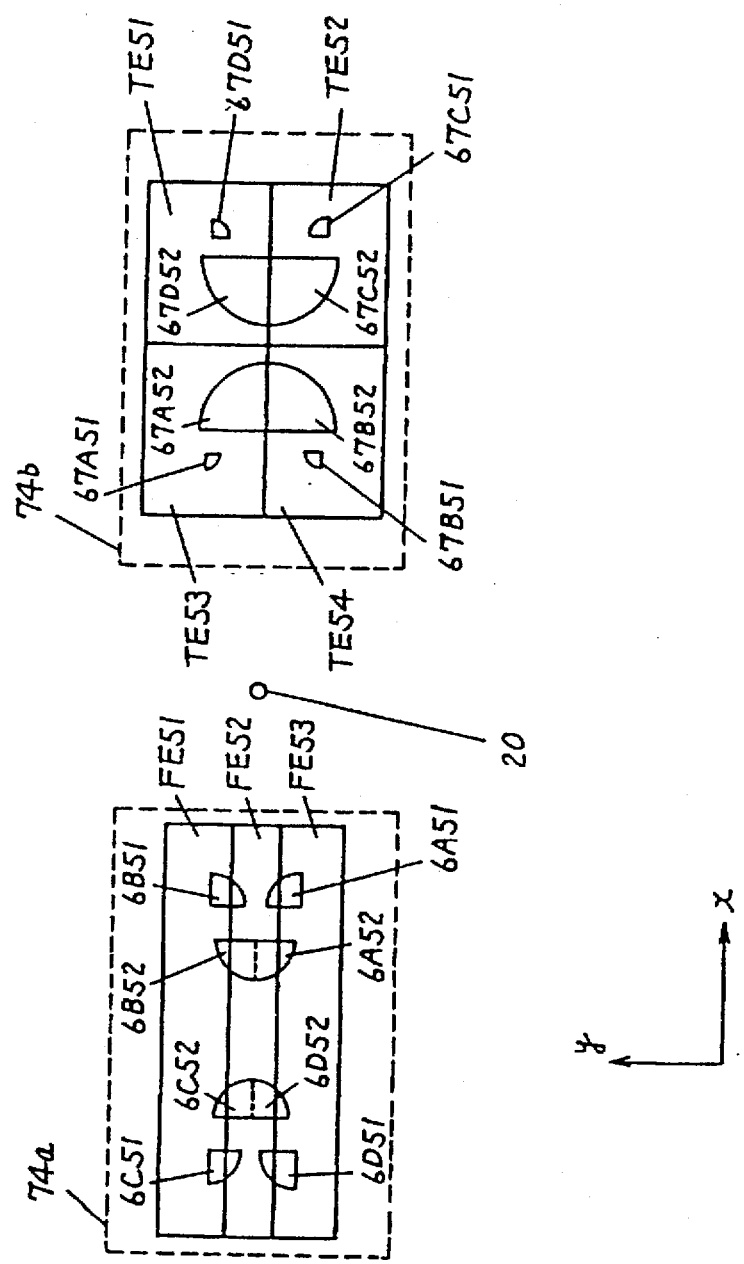
FIG. 14 is a schematic view illustrating photodetectors in still another example according to the present invention.

The photodetector 74a is used for detecting a focusing error signal and includes detection areas FE51 through FE53 as is shown in FIG. 14. The photodetector 74b is used for detecting a tracking error signal and includes detection areas TE51 through TE54. Each detection area outputs a signal in accordance with the amount of light incident thereon.

Plus first-order diffracted light beams 6A51 through 6D51, which are incident on the detection areas FE51 through FE53, are respectively generated by the diffraction areas A through D of the holographic optical element 175 and have focal points behind the photodetector 74a. Plus first-order diffracted light beams 6A52 through 6D52, which are incident on the detection areas FE51 through FE53, are respectively generated by the diffraction areas A through D of the holographic optical element 175 and have focal points in front of the photodetector 74a.

Minus first-order diffracted light beams 67A51 through 67D51, which irradiate the detection areas TE53, TE54, TE52 and TE51, are respectively conjugate waves of the plus first-order diffracted light beams 6A51 through 6D51, and the light beams 67A51 through 67D51 each have a focal point in front of the photodetector 74b. Minus first-order diffracted light beams 67A52 through 67D52 are respectively conjugate waves of the plus first-order diffracted light beams 6A52 through 6D52, and each have a focal point behind the photodetector 74b.

In this example, when the light spot is in focus on the recording medium 5, a plus first-order diffracted light beam having a focal point in front of the photodetector which is generated from a diffraction area is closest to the plus first-order diffracted light beam having a focal point behind the photodetector which is generated by the same diffraction area. Further, these two light beams are located on one straight line which is substantially parallel to the x axis.

For instance, the plus first-order diffracted light beams 6A51 having a focal point behind the photodetector 74a is closest to the plus first-order diffracted light 6A52 having a focal point in front of the photodetector 74a when the light spot is in focus on the recording medium 5. The plus first-order diffracted light beams 6A51 and 6A52 are on the boundary between the detection areas FE52 and FE53 of the photodetector 74a.

Minus first-order diffracted light beams which are conjugate with the plus first-order diffracted light beams are positioned in a same manner. For example, a minus first-order diffracted light beam 67A51 having a focal point in front of the photodetector 74b is closest to a minus first-order diffracted light 67A52 when the light spot is in focus on the recording medium 5.

A focusing error signal and a tracking error signal can be obtained in the same manner as in the previous examples.

A focusing error signal FE is expressed by equation (41).

$$FE = FE51 + FE53 - FE52 \quad (41)$$

A tracking error signal TE is obtained by the phase difference method, that is, by first obtaining two signals TE1 and TE2 changing over time using equations (42) and (43) and then comparing the phases of the signals TE1 and TE2.

$$TE1 = TE51 + TE53 \quad (42)$$

$$TE2 = TE52 + TE54 \quad (43)$$

A tracking error signal TE can be obtained by equation (44) by the push-pull method.

$$TE = (TE51 + TE52) - (TE53 + TE54) \quad (44)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is for obtaining the tracking error signal by the push-pull method. In accordance with the type of the recording medium for which a tracking error signal is to be obtained, one of the circuits is used. Thus, accurate tracking servo control can be performed.

Since the number of detection areas in the photodetector is less in this example, a lesser number of connection routes are required between the photodetector and a computation circuit. Accordingly, the number of steps of connection is decreased, which reduces the production cost. The detectors 74a and 74b can be reduced in size due to a lesser number of connection areas with external devices, and thus the size of the optical head device 100 is also reduced.

In this example, the plus first-order diffracted light beams can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have a uniform intensity in the y direction. As a result, the resultant focusing error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

If the wavelength of the light emitted by the light source 2 is different from a designed value, the diffracted light moves in the x direction. However, since the minus first-order diffracted light remains within a desired area of the photodetector 74b, a stable tracking error signal can be obtained.

An information signal RF can be obtained with sufficient ease using, for example, equation (45) or (46), or the sum of equations (45) and (46).

$$RF = TE51 + TE52 + TE53 + TE54 \quad (45)$$

$$RF = FE51 + TE52 + FE53 \quad (46)$$

EXAMPLE 7

The photodetectors 74a and 74b in stall another example according to the present invention will be described with reference to FIG. 15. In this example, the structure of the photodetectors 74a and 74b and the pattern of the diffracted light beams radiated to the photodetectors 74a and 74b are different from those in the first example. The optical head device 100 in this example has the same structure as that in the first example except for the above-mentioned points, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N–1.

Figure 15:
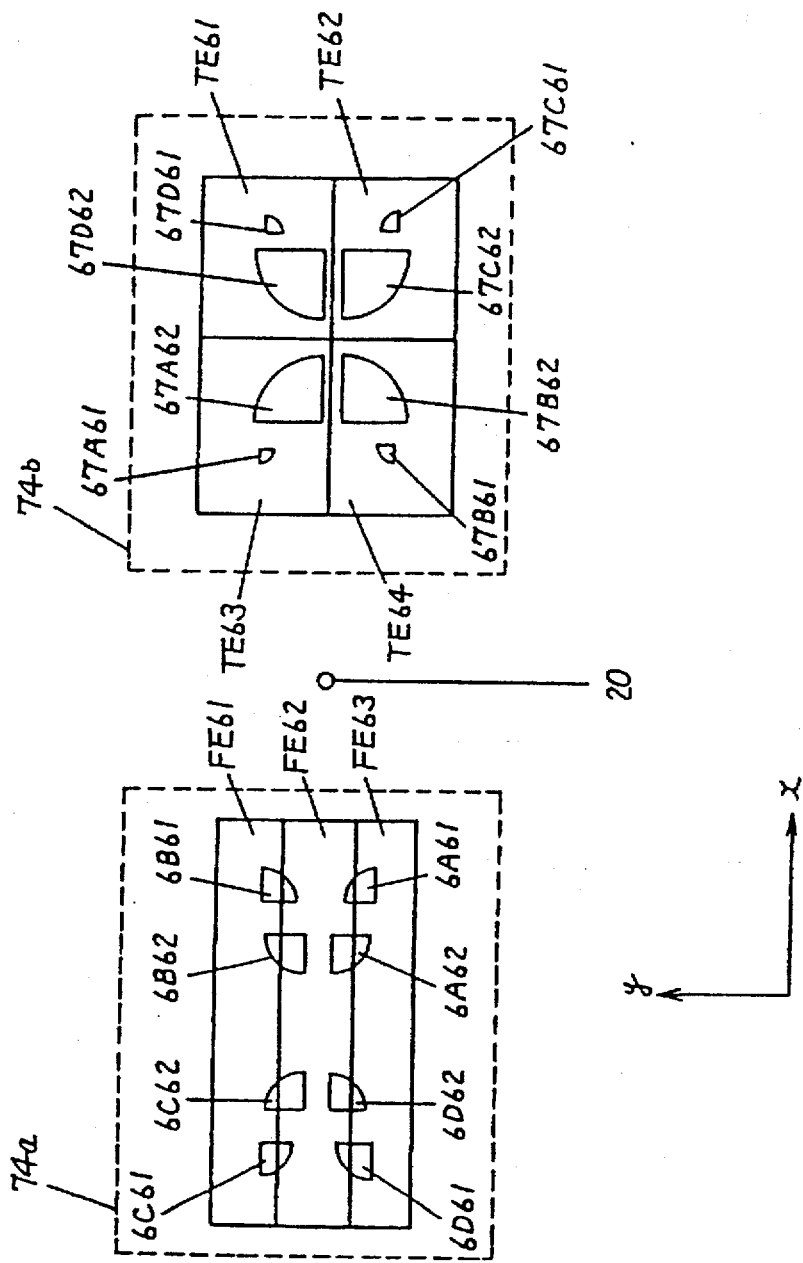
FIG. 15 is a schematic view illustrating photodetectors in still another example according to the present invention.

The photodetector 74a is used for detecting a focusing error signal and includes detection areas FE61 through TE63 as is shown in FIG. 15. The photodetector 74b is used for detecting a tracking error signal and includes detection areas TE61 through. TE64. Each detection area outputs a signal An accordance with the amount of light incident thereon.

Plus first-order diffracted light beams 6A61 through 6D61, which are incident on the detection areas FE61 through FE63, are respectively generated by the diffraction areas A through D of the holographic optical element 175 and have focal points behind the photodetector 74a. Plus first-order diffracted light beams 6A62 through 6D62, which are incident on the detection areas FE61 through FE63, are respectively generated by the diffraction areas A through D of the holographic optical element 175 and have focal points in front of the photodetector 74a.

Minus first-order diffracted light beams 67A61 through 67D61, which irradiate the detection areas TE63, TE64, TE62 and TE61, are respectively conjugate waves of the plus first-order diffracted light beams 6A61 through 6D61, and the light beams 67A61 through 67D61 each have a focal point in front of the photodetector 74b. Minus first-order diffracted light beams 67A62 through 67D62 are respectively conjugate waves of the plus first-order diffracted light beams 6A62 through 6D62, and each have a focal point behind the photodetector 74b.

In this example, when the light spot is in focus on the recording medium 5, a plus first-order diffracted light beam having a focal point in front of the photodetector which is generated from a diffraction area is closest to the plus first-order diffracted light beam having a focal point behind the photodetector which is generated by the same diffraction area. Further, these two light beams are located on one straight line which is substantially parallel to the x axis.

For instance, the plus first-order diffracted light beam 6A61 having a focal point behind the photodetector 74a is closest to the plus first-order diffracted light 6A62 having a focal point in front of the photodetector 74a when the light spot is in focus on the recording medium 5. The plus first-order diffracted light beams 6A61 and 6A62 are on the boundary between the detection areas FE62 and FE63 of the photodetector 74a.

Minus first-order diffracted light beams which are conjugate with the plus first-order diffracted light beams are positioned in a similar manner. For example, a minus first-order diffracted light beam 67A61 having a focal point in front of the photodetector 74b is closest to a minus first-order diffracted light 67A62 when the light spot is in focus on the recording medium 5.

Further, the plus first-order diffracted light beams 6A61 and 6D61 are separated from the plus first-order diffracted light beams 6B61 and 6C61 in the y direction; and the plus first-order diffracted light beams 6A62 and 6D62 are separated from the plus first-order diffracted light beams 6B62 and 6C62 in the y direction.

Accordingly, when the light spot is in focus on the recording medium 5, the minus first-order diffracted light beams 67A61 and 67D61 which are conjugate with the plus first-order diffracted light beams 6A61 and 6D61 are also separated from the minus first-order diffracted light beams 67B61 and 67C61 in the y direction, and the minus first-order diffracted light beams 67A62 and 67D62 are separated from the minus first-order diffracted light beams 67B62 and 67C62 in the y direction.

Even if the light emitting point 20 is offset in the y direction during the assembly of the optical head device 100, the minus first-order diffracted light remains within a desired area of the photodetector 74b. Due to such a structure, the positional tolerance in assembly is increased, which reduces the assembly cost.

Especially in the case where the photodetectors 74a and 74b and the light source 2 are integrally structured as a hybrid optical device as is shown in FIG. 3, if the light emitting point 20 of the light source 2 is offset in the y direction with respect to the photodetectors 74a and 74b, the relative positions of the plus first-order diffracted light and the photodetector 74a need to be adjusted by relatively rotating the holographic optical element 175 and the photodetectors 74a and 74b around the z axis, in order to obtain a satisfactory focusing error signal.

By such adjustment, the offset amount of the minus first-order diffracted light with respect to the photodetector 74b increases. However, since the minus first-order diffracted light beams 67A62 and 67D62 are separated from the minus first-order diffracted light beams 67B62 and 67C62 in the y direction, the minus first-order diffracted light remains within the desired area of the photodetector 74b. Due to such a structure, the positional tolerance of the light emitting point 20 with respect to the photodetectors 74a and 74b increases, and thus the assembly cost is reduced.

If the wavelength of the light emitted by light source 2 is different from a designed value, the diffracted light moves toward the x direction. However, since the minus first-order diffracted light remains within the desired area of the photodetector 74b, a stable tracking error signal can be obtained.

A focusing error signal and a tracking error signal can be obtained in the same manner as in the previous examples.

A focusing error signal FE is expressed by equation (47).

$$FE=FE61+FE63-FE62 \quad (47)$$

A tracking error signal TE is obtained by the phase difference method, that is, by first obtaining two signals TE1 and TE2 changing over time using equations (48) and (49) and then comparing the phases of the signals TE1 and TE2.

$$TE1=TE61+TE63 \quad (48)$$

$$TE2=TE62+TE64 \quad (49)$$

A tracking error signal TE can be obtained by equation (50) by the push-pull method.

$$TE=(TE61+TE62)-(TE63+TE64) \quad (50)$$

A rewritable-type medium has only a tracking groove but no pits when marketed. For such a medium, the push-pull method is effective. Accordingly, the optical head device 100 includes two circuits for obtaining a tracking error signal from the output signal from the photodetector 74b: one is for obtaining the tracking error signal by comparing the phases of the two signals TE1 and TE2, and the other is obtaining the tracking error signal by the push-pull method. In accordance with the type of the recording medium for which a tracking error signal is to be obtained, one of the circuits is used. Thus, accurate tracking servo control can be performed.

Since the number of detection areas in the photodetector is less in this example, a lesser number of connection routes are required between the photodetector and a computation circuit. Accordingly, the number of steps of connection is decreased, which reduces the production cost. The detectors 74a and 74b can be reduced in size due to a lesser number of connection areas with external devices, and thus the size of the optical head device 100 is also reduced.

In this example, the plus first-order diffracted light beams can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have a uniform intensity in the y direction. As a result, the resultant focusing error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

An information signal RF can be obtained with sufficient ease using, for example, equation (51) or (52), or the sum of equations (51) and (52).

$$RF=TE61+TE62+TE63+TE64 \quad (51)$$

$$RF=FE61+FE62+FE63+FE64 \quad (52)$$

EXAMPLE 8

The photodetectors 74a and 74b in still another example according to the present invention will be described with reference to FIG. 16. In this example, the structure of the photodetectors 74a and 74b and the pattern of the diffracted light beams radiated to the photodetectors 74a and 74b are different from those in the first example. The optical head device 100 in this example has the same structure as that in the first example except for the above-mentioned points, and the description thereof will be omitted. In this example, the optical head device 100 detects a focusing error signal using plus Nth-order diffracted light beams generated by the holographic optical element 175 and detects a tracking error signal using minus Nth-order diffracted light beams which are conjugate with the plus Nth-order diffracted light beams. In this example, N=1.

Figure 16:
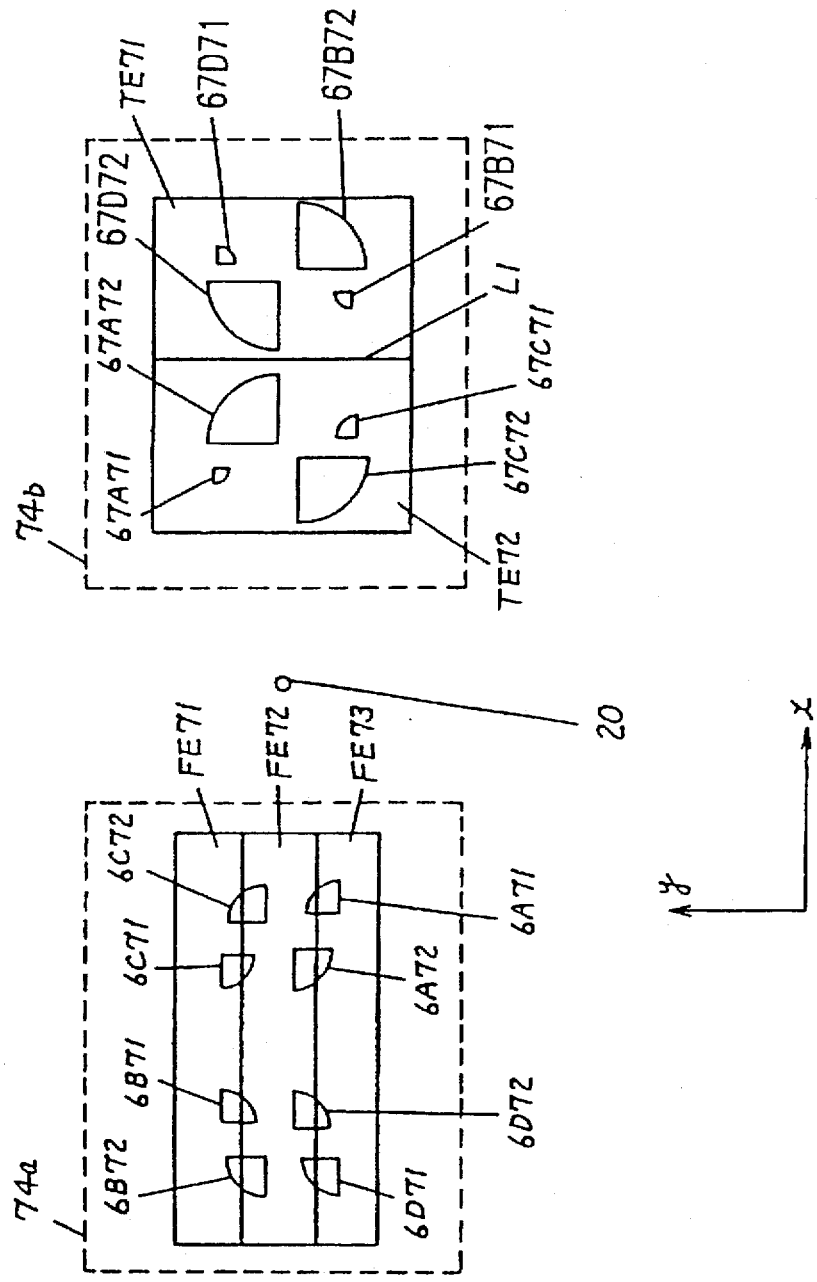
FIG. 16 is a schematic view illustrating photodetectors in still another example according to the present invention.

The photodetector 74a is used for detecting a focusing error signal and includes detection areas FE71 through FE73 as is shown in FIG. 16. The photodetector 74b is used for detecting a tracking error signal and includes detection areas TE71 and TE72. Each detection area outputs a signal in accordance with the amount of light incident thereon.

Plus first-order diffracted light beams 6A71 through 6D71, which are incident on the detection areas FE71 through FE73, are respectively generated by the diffraction areas A through D of the holographic optical element 175 and have focal points behind the photodetector 74a. Plus first-order diffracted light beams 6A72 through 6D72, which are incident on the detection areas FE71 through FE73, are respectively generated by the diffraction areas A through D of the holographic optical element 175 and have focal points in front of the photodetector 74a.

Minus first-order diffracted light beams 67A71 through 67D71, which irradiate the detection areas TE71 and TE72, are respectively conjugate waves of the plus first-order diffracted light beams 6A71 through 6D71, and the light beams 67A71 through 67D71 each have a focal point in front of the photodetector 74b. Minus first-order diffracted light beams 67A72 through 67D72 are respectively conjugate waves of the plus first-order diffracted light beams 6A72 through 6D72, and each have a focal point behind the photodetector 74b.

In this example, when the light spot is in focus on the recording medium 5, a plus first-order diffracted light beam having a focal point in front of the photodetector which is generated from a diffraction area is closest to the plus first-order diffracted light beam having a focal point behind the photodetector which is generated by the same diffraction area. Further, these two light beams are located on one straight line which is substantially parallel to the x axis.

For instance, the plus first-order diffracted light beam 6A71 having a focal point behind the photodetector. 74a is closest to the plus first-order diffracted light beam 6A72 having a focal point in front of the photodetector 74a when the light spot is in focus on the recording medium 5. The plus first-order diffracted light beams 6A71 and 6A72 are on the boundary between the detection areas FE72 and FE73 of the photodetector 74a.

Minus first-order diffracted light beams which are conjugate with the plus first-order diffracted light beams are positioned in a similar manner. For example, a minus first-order diffracted light beam 67A71 having a focal point in front of the photodetector 74b is closest to a minus first-order diffracted light 67A72 when the light spot is in focus on the recording medium 5.

Further, the plus first-order diffracted light beams 6A71 and 6D71 are separated from the plus first-order diffracted light beams 6B71 and 6C71 in the y direction; and the plus first-order diffracted light beams 6A72 and 6D72 are separated from the plus first-order diffracted light beams 6B72 and 6C72 in the y direction.

Accordingly, when the light spot is in focus on the recording medium 5, the minus first-order diffracted light beams 67A71 and 67D71 which are conjugate with the plus first-order diffracted light beams 6A71 and 6D71 are also separated from the minus first-order diffracted light beams 67B71 and 67C71 in the y direction, and the minus first-order diffracted light beams 67A72 and 67D72 are separated from the minus first-order diffracted light beams 67B72 and 67C72 in the y direction.

The minus first-order diffracted light beams generated by the diffraction areas A and C are separable from the minus first-order diffracted light beams generated by the diffraction areas B and C by one border line L1.

If the wavelength of the light emitted by the light source 2 is different from a designed value, the diffracted light moves toward the x direction. However, since the minus first-order diffracted light remains within a desired area of the photodetector 74b, a stable tracking error signal can be obtained.

Even if the light emitting point 20 is offset in the y direction during the assembly of the optical head device 100, the minus first-order diffracted light remains within a desired area of the photodetector. Due to such a structure, the positional tolerance for assembly is increased, which reduces the assembly cost.

Especially in the case where the photodetectors 74a and 74b and the light source 2 are integrally structured as a hybrid optical device as is shown in FIG. 3, if the light emitting point 20 of the light source 2 is offset in the y direction with respect to the photodetectors 74a and 74b, the relative positions of the plus first-order diffracted light and the photodetector 74a need to be adjusted by relatively rotating the holographic optical element 175 and the photodetectors 74a and 74b around the z axis, in order to obtain a satisfactory focusing error signal.

By such adjustment, the offset amount of the minus first-order diffracted light with respect to the photodetector 74b increases. However, since the minus first-order diffracted light beams 67A71 and 67D72 are separated from the minus first-order diffracted light beams 67B72 and 67C72 in the y direction, the minus first-order diffracted light remains within the desired area of the photodetector 74b. Due to such a structure, the positional tolerance of the light emitting point 20 with respect to the photodetectors 74a and 74b increases, and thus the assembly cost is reduced.

A focusing error signal and a tracking error signal can be obtained in the same manner as in the previous examples.

A focusing error signal FE is expressed by equation (53).

$$FE=FE71+FE73-FE72 \tag{53}$$

A tracking error signal TE is obtained by comparing the phases of signals TE71 and TE72.

Since the number of detection areas in the photodetector is less in this example, a lesser number of connection routes are required between the photodetector and a computation circuit. Accordingly, the number of steps of connection is decreased, which reduces the production cost. The detectors 74a and 74b can be reduced in size due to a lesser number of connection areas with external devices, and thus the size of the optical head device 100 is also reduced.

Especially, the number of detection areas for detecting a tracking error signal in the photodetector is less and thus a tracking error signal can be obtained merely by comparing the phases of the signals from these detection areas. The production cost can be reduced because of a lesser number of computation circuits.

In this example, the plus first-order diffracted light beams can be used substantially entirely to obtain a focusing error signal. Accordingly, the obtained focusing error signal has a sufficiently large amplitude and a sufficiently high S/N ratio. For the same reason, the diffracted light beams for detecting a focusing error signal have a uniform intensity in the y direction. As a result, the resultant focusing error signal has a satisfactory level of sensitivity.

Also in this example, the minus first-order diffracted light beams can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

An information signal R can be obtained with sufficient ease using, for example, equation (54) or (55), or the sum of equations (54) and (55).

$$RF=TE71+TE72 \tag{54}$$

$$RF=FE71+FE71+FE73 \tag{55}$$

Figure 17:
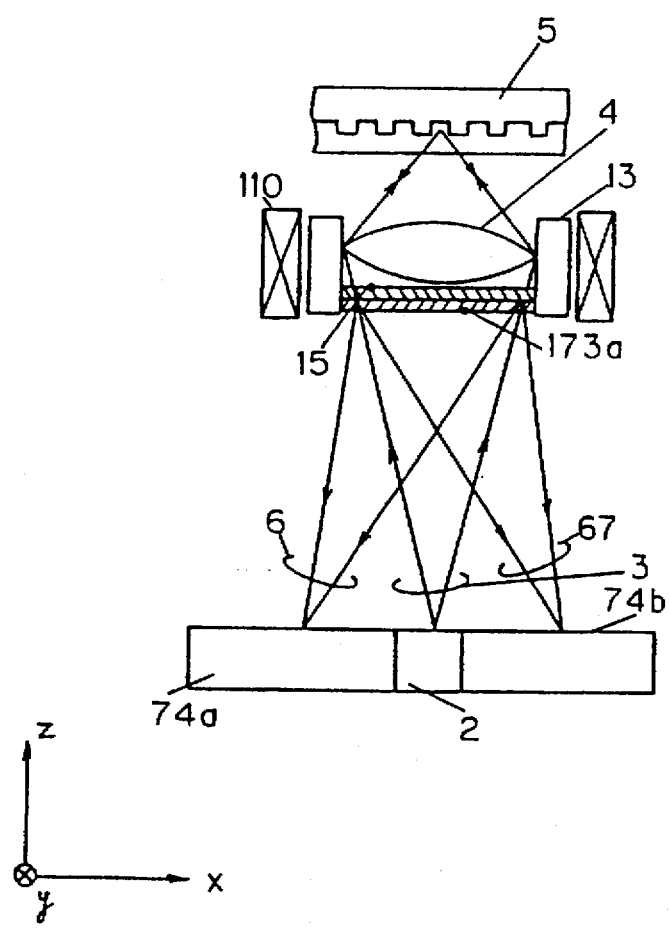
FIG. 17 is a schematic view of an optical head device in another example according to the present invention.

In the above-described examples, a so-called infinite optical system is used, As is shown in FIG. 17, a finite optical system without, for example, a collimating lens can be used. By the elimination of the collimating lens 1220, the number of parts is reduced. Thus, the assembly cost is reduced and the size of the optical head device 100 is also reduced.

EXAMPLE 9

Figure 18:
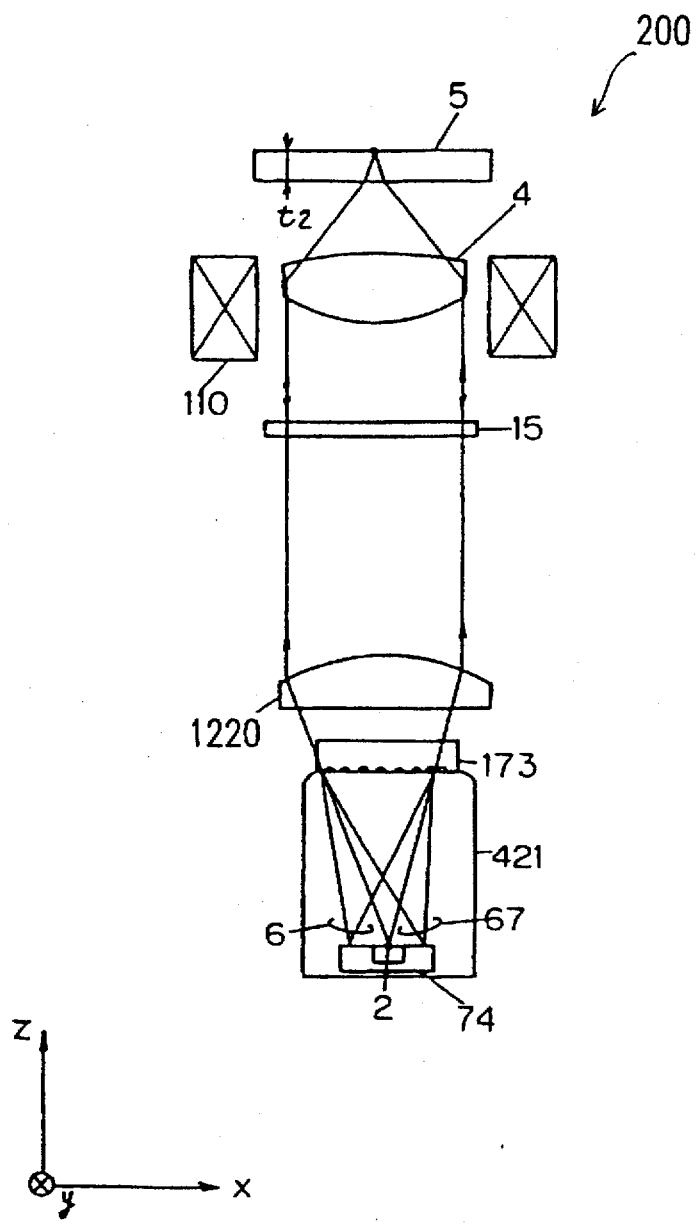
FIG. 18 is a schematic view of an optical head device in still another example according to the present invention.

An optical head device 200 in another example according to the present invention will be described with reference to FIG. 18. The optical head device 200 is different from the optical head device 100 shown in FIG. 1 in that the quarter-wave plate 15 and a polarization anisotropic holographic optical element 173 are not integrally structured with the objective lens 4.

Due to such a structure, the number of parts to be moved by the driver 110 is less than in the optical head device 100. Accordingly, the optical head device 200 is lighter and provides better performance an focusing and tracking control. Further, the necessary driving power is lowered, and the driver 110 is reduced in size.

In order to prevent change of the characteristics of the light source 2 over time, the optical head device 200 is preferably sealed in a package 421. By using the holographic optical element 173 as an outgoing window of the package 421, the number of parts and the weight of the optical head device 200 are reduced. The production cost is also reduced.

EXAMPLE 10

Figure 19:
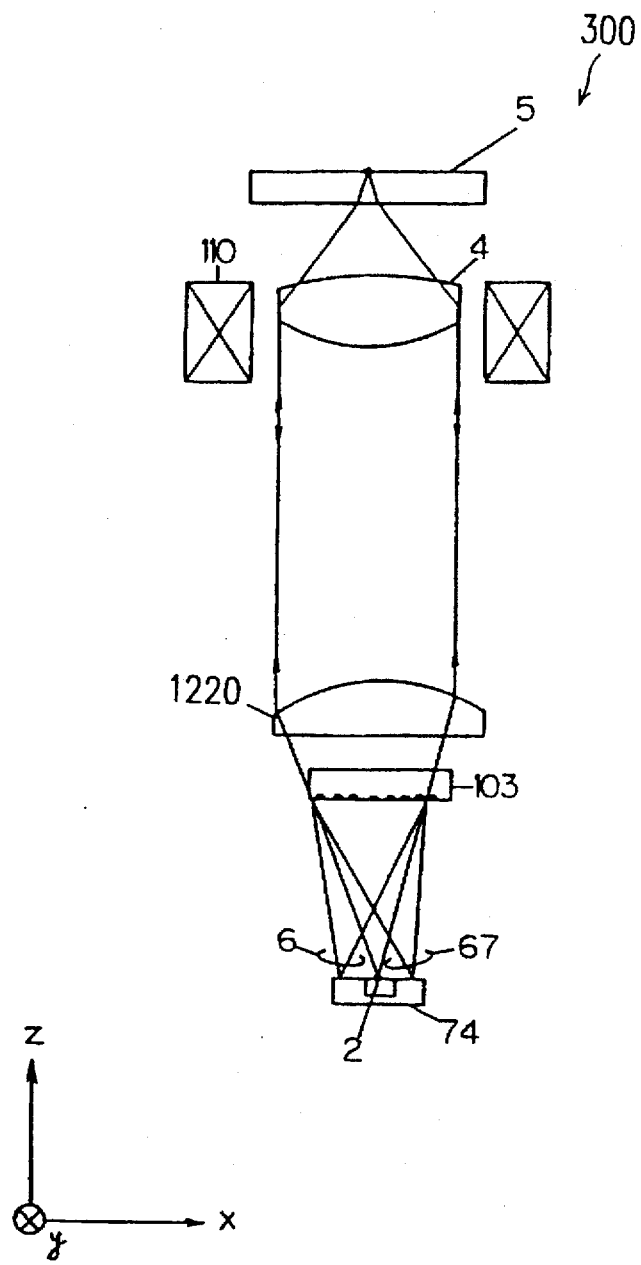
FIG. 19 is a schematic view of an optical head device in still another example according to the present invention.

An optical head device 300 in still another example according to the present invention will be described with reference to FIGS. 19 and 20. The optical head device 300 is different from the optical head device 200 shown in FIG. 18 in that the quarter-wave plate 15 is eliminated and a polarization anisotropic holographic optical element 103 is formed of transparent glass or other transparent materials.

Figure 20:
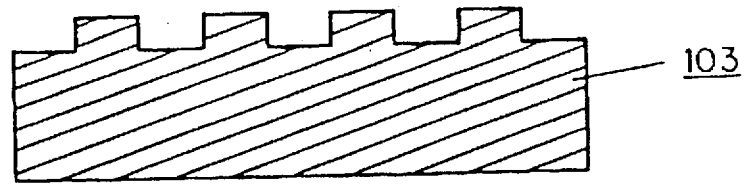
FIG. 20 is a cross sectional view of a holographic optical element according to the present invention.

The holographic optical element 103 can be formed with sufficient ease by, for example, forming a corrugation at a surface of a transparent substrate as is shown in FIG. 20.

Due to such a structure, the number of parts to be moved by the driver 110 is still less than in the optical head device 200. Accordingly, the optical head device 300 is lighter and provides better performance in focusing and tracking control. Further, the necessary driving power is lowered, and the driver 110 is reduced in size.

In order to prevent change of the characteristics of the light source 2 over time, the optical head device 300 is preferably sealed in a package. By using the holographic optical element 103 as an outgoing window of the package, the number of parts and the weight of the optical head device 300 are reduced. The production cost is also reduced.

The elimination of the quarter-wave plate 15 further reduces the number of parts, the weight, and the assembly cost.

Since the holographic optical element 103 is formed of glass or the like, duplicates can be mass-produced by a press method with sufficient ease and at sufficiently low cost.

EXAMPLE 11

An optical head device 400 in still another example according to the present invention will be described with reference to FIGS. 21 and 22.

Figure 21:
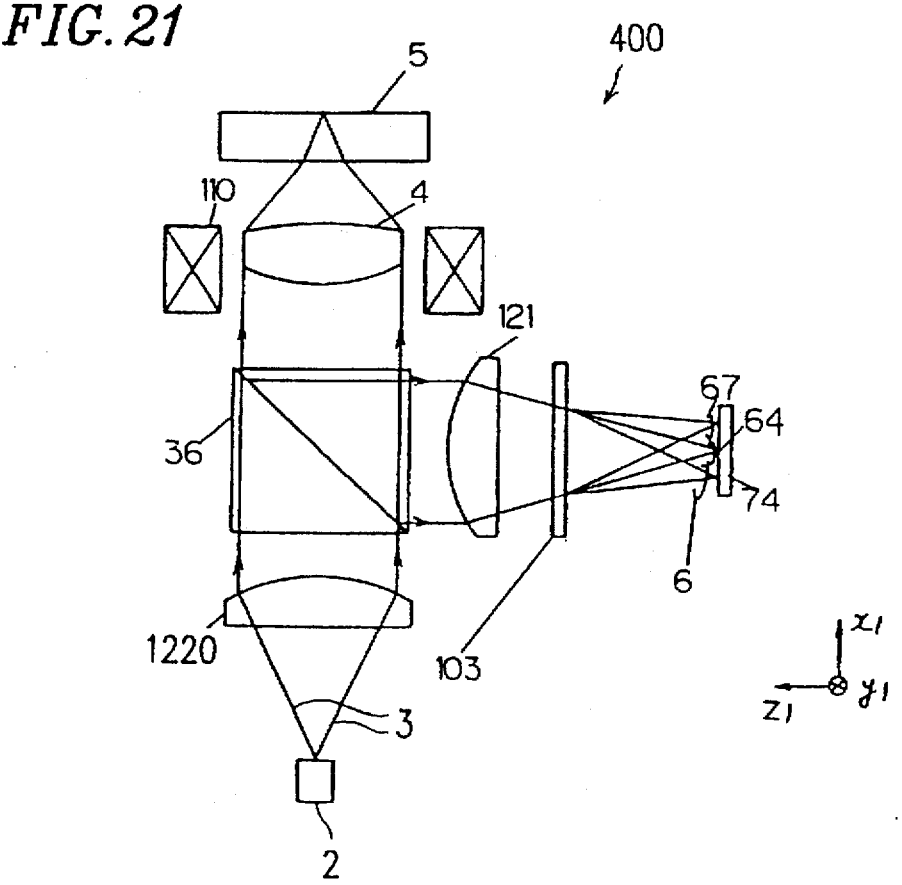
FIG. 21 is a schematic view of an optical head device in still another example according to the present invention.
Figure 22:
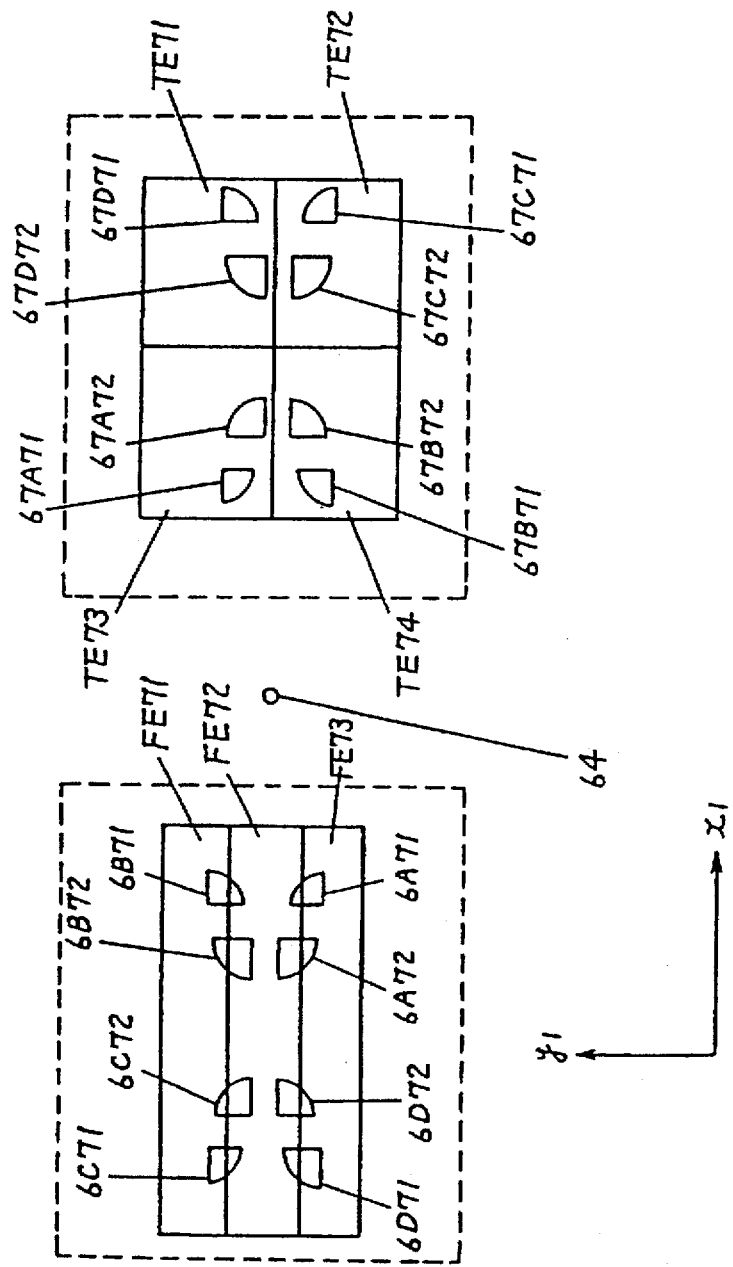
FIG. 22 is a schematic view illustrating photodetectors an still another example according to the present invention.

FIG. 21 is a schematic view of the optical head device 400. A light beam 3 emitted by the light source 2 such as a semiconductor laser is substantially collimated by a collimating lens 1220, transmits through a beam splitter 36, and enters the objective lens 4. Then, the light beam 3 is focused onto the recording medium 5. The light beam 3 reflected by the recording medium 5 is reflected by the beam splitter 36, and is collected by a collecting lens 121. Then, minus first-order diffracted light 67, plus first-order diffracted light 6, and zero-order diffracted light 64 are incident on the photodetector 74.

By computing the outputs from the photodetector 74, servo signals (focusing error signals and tracking error signals) and information signals are obtained.

In this example, by increasing the numerical aperture (NA) in the collimating lens 1220, the intensity of the light beam 3 which is guided into an effective opening of the objective lens 4 is increased, thereby raising the light utilization efficiency. Further, by reducing the numerical aperture in the collecting lens 121 to increase the depth magnification of the collecting lens 121 with respect to the objective lens 4, the sensitivity of the focusing error signal is enhanced.

Moreover, by inserting a wave-shaper such as a wedge-shaped prism or an anamorphic lens between the light source 2 and the collimating lens 1220, the light spot on the recording medium 5 can be reduced in size.

By replacing the beam splitter 36 with a polarization beam splitter and a quarter-wave plate, the light utilization efficiency is raised and the intensity of the light returning to the light source 2 is reduced. Even if a semiconductor laser is used as the light source 2, generation of noise in the returning light can be reduced significantly.

The position of the photodetector 74 in the direction of the optical axis (Z1 direction) can be arbitrarily changed. Accordingly, the photodetector 74 can be designed so that the shape of the spot of the minus first-order diffracted light is the same as that of the plus first-order diffracted light as is shown in FIG. 22. Thus, the positional tolerance for assembling the optical head device 400 increases, which reduces the assembly cost.

EXAMPLE 12

Figure 23:
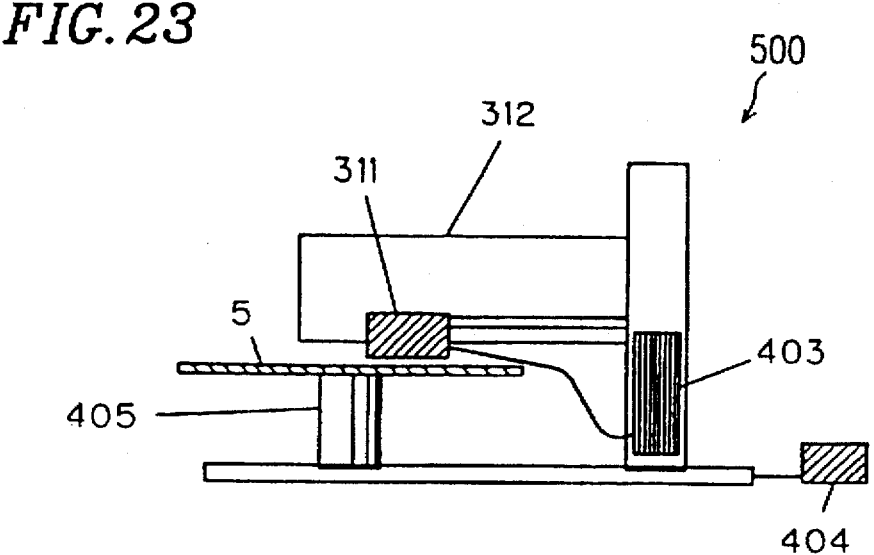
FIG. 23 is a schematic view of an optical information apparatus including an optical head device according to the present invention.
Figure 24:
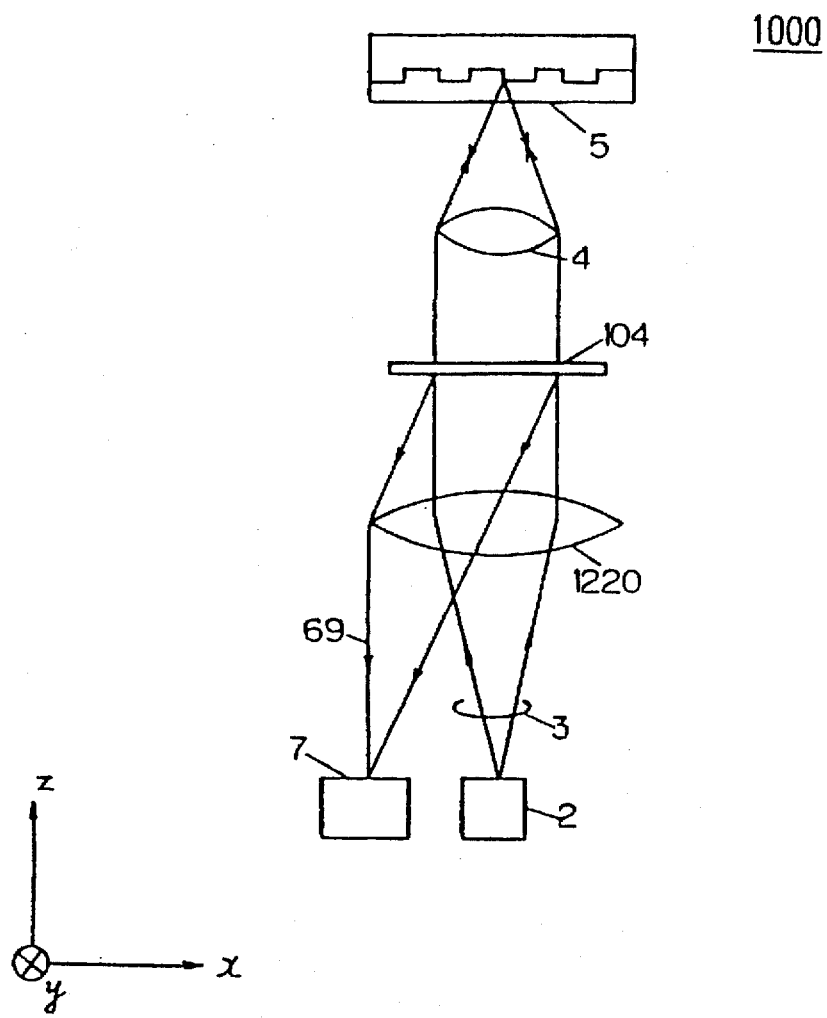
FIG. 24 is a schematic view of a conventional optical head device.
Figure 25A:
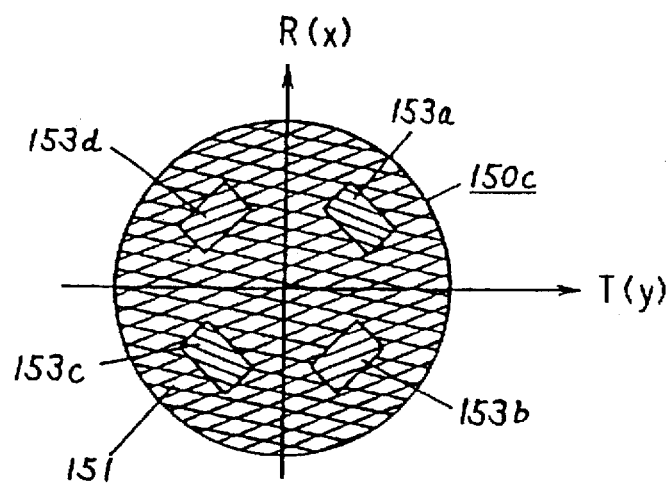
FIG. 25A is a view illustrating a hologram pattern in the conventional optical head device.
Figure 25B:
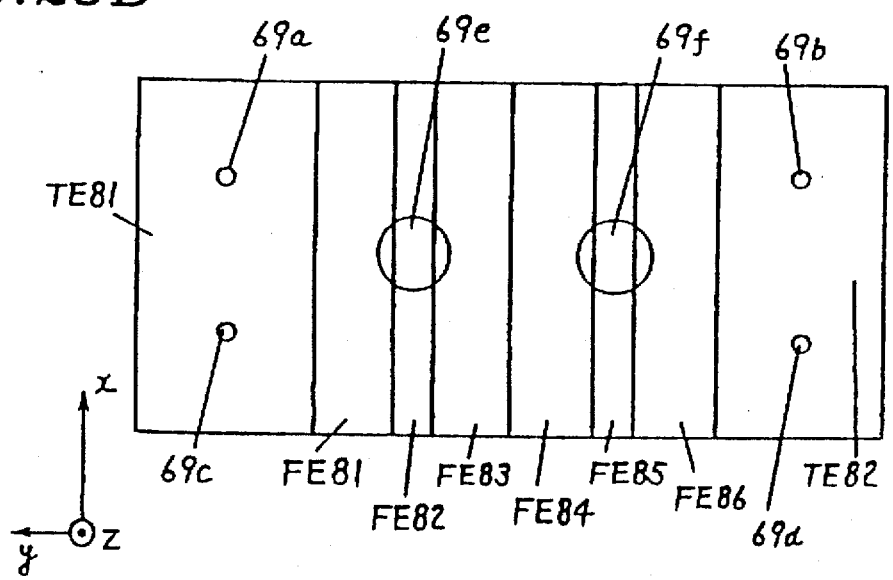
FIG. 25B is a plan view illustrating spots of diffracted light beams on a photodetector in the conventional optical head device.

An optical information apparatus 500 including an optical head device 311 according to the present invention will be described with reference to FIG. 23.

The recording medium 5 is rotated by a recording medium driving mechanism 405. An optical head device 311 is coarsely adjusted by an optical head driving device 312 to move to the track of the recording medium 5 having desired information (target track). The optical head driving device 312 is connected to a power source via a connector 404.

The optical head device 311 sends a focusing error signal or a tracking error signal to an electric circuit 403 in accordance with the positional relationship between the target track and the recording mediums 5. The electric circuit 403 sends a signal for fine adjustment of the objective lens 4 to the optical head device 311 in response to the focusing error signal or the tracking error signal. By the signal from the electric circuit 403, the optical head device 311 performs focus servo and tracking servo control of the recording medium 5, thereby performing reading, writing or erasing of information.

Due to the optical head device 311 according to the present invention which detects an information signal having a satisfactorily high S/N ratio, information can be reproduced accurately and stably in the optical information apparatus 500.

Due to the compactness and the lightness of the optical head device 311, the optical information apparatus 500 including the optical head device 311 is also compact and light-weight and has a short access time.

In the optical head device, a tracking error signal is detected by the phase difference method. Accordingly, even if the hologram is located at a different position from a designed position, reproduction of information is performed accurately and stably.

According to the present invention, the following effects are achieved.

(1) The plus first-order diffracted light can be used substantially entirely to obtain a focusing error signal. Accordingly, the obtained focusing error signal has a sufficiently large amplitude and a sufficiently high S/N ratio. For the same reason, the diffracted light for detecting a focusing error signal has a uniform intensity in the y direction (perpendicular to the dividing line in the photodetector). As a result, the resultant focusing error signal has a satisfactory level of sensitivity. Also, the minus first-order diffracted light can be used substantially entirely to obtain a tracking error signal. Accordingly, the obtained tracking error signal has a sufficiently large amplitude and a sufficiently high S/N ratio. For the same reason, stable signal detection is performed even if the recording medium is scratched.

(2) The positional tolerance of the light emitting point of the light source with respect to the photodetector increases, and thus the assembly cost is reduced.

(3). In an example in which the number of detection areas in the photodetector is less, a lesser number of connection routes are required between the photodetector and a computation circuit. Accordingly, the number of steps of connection is decreased and thus the production cost is reduced. A lesser number of connection areas between the photodetector and external devices reduces the size of the optical head device.

(4) In the case where a polarization anisotropic holographic optical element and a quarter-wave plate are used in combination, unnecessary diffraction is avoided on the forward light path, and a diffracted light beam for obtaining a servo signal and the like is generated on the backward light path. Accordingly, there is substantially no noise caused by unnecessary diffraction. Also because of the elimination of unnecessary diffraction on the forward light path, the light utilization efficiency is sufficiently high. As a result, a signal having a sufficiently high S/N ratio is obtained.

(5) In the case where the positional relationship among a polarization anisotropic holographic optical element, a quarter-wave plate, and an objective lens is maintained by a supporting device, even if the objective lens moves for tracking control, the polarization anisotropic holographic optical element and the quarter-wave plate move integrally. Accordingly, the light beam reflected by the recording medium does not move substantially at all on the holographic optical element. Since the diffracted light beam on the photodetector does not move, the signal obtained by the photodetector does not deteriorate. Thus, a focusing error signal can be obtained stably. A tracking error signal can also be obtained stably with substantially no offset because the diffracted light beam for detecting the tracking error signal is obtained from a constant position on a farfield pattern of the light beam.

(6) Use of the SSD method for detecting a focusing error signal increases the tolerance in assembling the optical head device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head device, comprising:
   a light source for emitting light;
   an optical system for focusing the light emitted by the light source onto an information medium to form a light spot;
   a photodetector including a plurality of light detection areas for receiving the light reflected by the information medium and for outputting photocurrents in accordance with the respective amount of the light received;
   a holographic optical element for diffracting the light reflected by the information medium and for directing the light to the photodetector; and
   a signal processing circuit section for obtaining a focusing error signal and a tracking error signal for controlling the light spot using the photocurrents,
   wherein the signal processing circuit section obtains the focusing error signal from the photocurrents which are obtained in accordance with the amount of light of one of ± first order diffracted beams, and obtains the tracking error signal from the photocurrents which are obtained in accordance with the amount of light of the other of the ± first order diffracted beams,
   the holographic optical element includes a substrate having a hologram formed thereon having a plurality of diffraction areas, and each of the diffraction areas generates, as plus first order diffracted beams, at least two light beams which are respectively focused between the photodetector and the holographic optical element and on one side of the photodetector opposite to the holographic optical element; and each of the diffraction areas generates, as minus first order diffracted light beams, at least two light beams which are respectively focused between the photodetector and the holographic optical element and on one side of the photodetector opposite to the holographic optical element,
   the plurality of diffraction areas includes at least a first, a second, a third and a fourth diffraction area arranged clockwise; the photodetector includes a first, a second, a third and a fourth detection area respectively for receiving the minus first order diffracted light beams from the first, the second, the third and the fourth diffraction areas; and the first, the second, the third and the fourth detection areas respectively output a first, a second, a third and a fourth photocurrent based on the amounts of light received,
   the signal processing circuit section obtains the tracking error signal based on the first, the second, the third and the fourth photocurrents, and
   the signal processing circuit section includes a phase comparison circuit for comparing the phases of the sum of the first and the third photocurrents and the sum of the second and the fourth photocurrents and then obtaining the differential phase, and obtains the tracking error signal using the differential phase.

2. An apparatus for optically performing at least one of reproduction of information from a recording medium and recording of information to the recording medium, the apparatus including the optical head according to claim 1.

3. An optical head device according to claim 1, wherein:
   where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area YP in the range of Y>0 and a diffraction area YM in the range of Y<0;
   the diffraction area YP generates, as plus first order diffracted light beams, a light beam YP1 having one of a focal point and a focal line between the photodetector and the holographic optical element and a light beam YP2 having one of a focal point and a focal line on one side of the photodetector opposite to the holographic optical element;
   the diffraction area YM generates, as minus first order diffracted light beams, a light beam YM1 having one of a focal point and a focal line between the photodetector and the holographic optical element and a light beam YM2 having one of a focal point and a focal line on one side of the photodetector opposite to the holographic optical element; and
   the light beams YP1 and YP2 are separated from each other in the x direction on the photodetector, and the light beams YM1 and YM2 are separated from each other in the x direction on the photodetector.

4. An optical head device according to claim 1, wherein:
   where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area XP in the range of X>0 and a diffraction area XM in the range of X>0;
   the diffraction area XP generates, as plus first order diffracted light beams, a light beam XP1 having one of a focal point and a focal line between the photodetector and the holographic optical element and a light beam XP2 having one of a focal point and a focal line on one side of the photodetector opposite to the holographic optical element;

the diffraction area XM generates, as minus first order diffracted light beams, a light beam XM1 having one of a focal point and a focal line between the photodetector and the holographic optical element and a light beam XM2 having one of a focal point and a focal line on one side of the photodetector opposite to the holographic optical element; and the light beams XP1 and XP2 are separated from each other in the y direction on the photodetector, and the light beams XM1 and XM2 are separated from each other in the y direction on the photodetector.

5. An optical head device according to claim 1, wherein:
the optical system includes an objective lens for converging the light beam, and the optical head device further comprises supporting means for supporting the objective lens, the quarter-wave plate and the holographic optical element at constant relative positions, thereby allowing the quarter-wave plate and the holographic optical element to move integrally with the objective lens.

6. An optical head device according to claim 1, wherein:
the photodetector includes a substrate having the plurality of light detection areas formed thereon, and the substrate has a concaved area having at least one inclined surface, the concaved area includes the light source therein, and the optical head device further comprises a reflective mirror located on the inclined surface for reflecting the light beam emitted from the light source in a direction substantially perpendicular to the substrate.

7. An optical head device according to claim 1, wherein:
where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, an area including the first and second diffraction areas and an area including the second and fourth diffraction areas are divided from each other by a line extending substantially parallel to the y axis, and the signal processing circuit section obtains the tracking error signal using the sum of the first and the second photocurrents and the sum of the third and the fourth photocurrents.

8. An optical head device according to claim 7, wherein the signal processing circuit section includes:

a phase comparison circuit for comparing the phases of the sum of the first and the third photocurrents and the sum of the second and the fourth photocurrents and obtaining the differential phase;

a first tracking error detection circuit for obtaining a tracking error signal using the differential phase;

a second tracking error detection circuit for obtaining a tracking error signal using the sum of the first and the second photocurrents and the sum of the third and the fourth photocurrents; and switching means for selecting one of the first tracking error detection circuit and the second tracking error detection circuit.

9. An optical head device according to claim 1, wherein the first detection area and the third detection area are identical with each other, and the second detection area and the fourth detection area are identical with each other.

10. An optical head device according to claim 1, further comprising a quarter-wave plate located between the holographic optical element and the information medium, wherein:

the holographic optical element is an anisotropic holographic optical element for diffracting only linearly polarized light in a prescribed direction, and the light beam emitted by the light source is a light beam linearly polarized in a direction perpendicular to the prescribed direction; and thus the holographic optical element diffracts only the light beam incident thereon after being reflected by the information medium and transmitted through the quarter-wave plate but does not diffract the light beam incident directly thereon after being emitted by the light source.

11. An optical head device, comprising:

a light source for emitting light;

an optical system for focusing the light emitted by the light source onto an information medium to form a light spot;

a photodetector including a plurality of light detection areas for receiving the light reflected by the information medium and for outputting photocurrents in accordance with the respective amount of the light received;

a holographic optical element for diffracting the light reflected by the information medium and for directing the light to the photodetector; and a signal processing circuit section for obtaining a focusing error signal and a tracking error signal for controlling the light spot using the photocurrents, wherein the signal processing circuit section obtains the focusing error signal from the photocurrents which are obtained in accordance with the amount of light of one of ± first order diffracted beams, and obtains the tracking error signal from the photocurrents which are obtained in accordance with the amount of light of the other of the ± first order diffracted beams;

the holographic optical element includes a substrate having a hologram formed thereon having a plurality of diffraction areas, and each of the diffraction areas generates, as plus first order diffracted beams, at least two light beams which are respectively focused between the photodetector and the holographic optical element and on one side of the photodetector opposite to the holographic optical element; and each of the diffraction areas generates, as minus first order diffracted light beams, at least two light beams which are respectively focused between the photodetector and the holographic optical element and on one side of the photodetector opposite to the holographic optical element;

the plurality of diffraction areas includes at least a first, a second, a third and a fourth diffraction area arranged clockwise; the photodetector includes a first, a second, a third and a fourth detection area respectively for receiving the minus first order diffracted light beams from the first, the second, the third and the fourth diffraction areas; and the first, the second, the third and the fourth detection areas respectively output a first, a second, a third and a fourth photocurrent based on the amounts of light received;

the signal processing circuit section obtains the tracking error signal based on the first, the second, the third and the fourth photocurrents;

an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, an area including the first and second diffraction areas and an area including the second and fourth diffraction areas are divided from each other by a line extending substantially parallel to the y axis;

the signal processing circuit section obtains the tracking error signal using the sum of the first and the second photocurrents and the sum of the third and the fourth photocurrents; and wherein the signal processing circuit section includes:

a phase comparison circuit for comparing the phases of the sum of the first and the third photocurrents and the sum of the second and the fourth photocurrents and obtaining the differential phase, a first tracking error detection circuit for obtaining a tracking error signal using the differential phase, a second tracking error detection circuit for obtaining a tracking error signal using the sum of the first and the second photocurrents and the sum of the third and the fourth photocurrents, and switching means for selecting one of the first tracking error detection circuit and the second tracking error detection circuit.

12. An optical head device according to claim 11, wherein:

the optical system includes an objective lens for converging the light beam, and the optical head device further comprises supporting means for supporting the objective lens, the quarter-wave plate and the holographic optical element at constant relative positions, thereby allowing the quarter-wave plate and the holographic optical element to move integrally with the objective lens.

13. An optical head device according to claim 11, wherein:

the photodetector includes a substrate having the plurality of light detection areas formed thereon, and the substrate has a concaved area having at least one inclined surface, the concaved area includes the light source therein, and the optical head device further comprises a reflective mirror located on the inclined surface for reflecting the light beam emitted from the light source in a direction substantially perpendicular to the substrate.

14. An apparatus for optically performing at least one of reproduction of information from a recording medium and recording of information to the recording medium, the apparatus including the optical head according to claim 11.

15. An optical head device according to claim 11, wherein:

where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area YP in the range of Y>0 and a diffraction area YM in the range of Y<0;

the diffraction area YP generates, as plus first order diffracted light beams, a light beam YP1 having one of a focal point and a focal line between the photodetector and the holographic optical element and a light beam YP2 having one of a focal point and a focal line on one side of the photodetector opposite to the holographic optical element;

the diffraction area YM generates, as minus first order diffracted light beams, a light beam YM1 having one of a focal point and a focal line between the photodetector and the holographic optical element and a light beam YM2 having one of a focal point and a focal line on one side of the photodetector opposite to the holographic optical element; and the light beams YP1 and YP2 are separated from each other in the x direction on the photodetector, and the light beams YM1 and YM2 are separated from each other in the x direction on the photodetector.

16. An optical head device according to claim 11, wherein:

where an imaginary x-y coordinate system, in which the origin is a substantial center of the hologram receiving the light beam reflected by the information medium, the y axis is in the direction substantially the same as the direction of one of pits and a groove formed in the information medium, and the x axis is substantially perpendicular to the y axis, is defined on the hologram, the plurality of diffraction areas includes at least a diffraction area XP in the range of X>0 and a diffraction area XM in the range of X<0;

the diffraction area XP generates, as plus first order diffracted light beams, a light beam XP1 having one of a focal point and a focal line between the photodetector and the holographic optical element and a light beam XP2 having one of a focal point and a focal line on one side of the photodetector opposite to the holographic optical element;

the diffraction area XM generates, as minus first order diffracted light beams, a light beam XM1 having one of a focal point and a focal line between the photodetector and the holographic optical element and a light beam XM2 having one of a focal point and a focal line on one side of the photodetector opposite to the holographic optical element; and the light beams XP1 and XP2 are separated from each other in the y direction on the photodetector, and the light beams XM1 and XM2 are separated from each other in the y direction on the photodetector.

17. An optical head device according to claim 11, wherein the signal processing circuit section includes a phase comparison circuit for comparing the phases of the sum of the first and the third photocurrents and the sum of the second and the fourth photocurrents and then obtaining the differential phase, and obtains the tracking error signal using the differential phase.

18. An optical head device according to claim 11, wherein the first detection area and the third detection area are identical with each other, and the second detection area and the fourth detection area are identical with each other.

19. An optical head device according to claim 11, further comprising a quarter-wave plate located between the holographic optical element and the information medium, wherein:

the holographic optical element is an anisotropic holographic optical element for diffracting only linearly polarized light in a prescribed direction, and the light beam emitted by the light source is a light beam linearly polarized in a direction perpendicular to the prescribed direction; and thus the holographic optical element diffracts only the light beam incident thereon after being reflected by the information medium and transmitted through the quarter-wave plate but does not diffract the light beam incident directly thereon after being emitted by the light source.

* * * * *

UNITED STATES PATENT AND TRADE MARK OFFICE
CERTIFICATE OF CORRECTION

PATENT NO. : 5,737,296
DATED : April 7, 1998
INVENTOR(S) : Komma et al.

It is certified that error appears in the above-identified patent and that said Letters Patent is hereby corrected as shown below:

Title page, item [75] should read:

> Yoshiaki Komma, Kyoto;
> Ken'ichi Kasazumi, Osaka
> Seiji Nishino, Osaka
> Hiroaki Yamamoto, Osaka
> All of Japan At column 8, line 22, "$n_o$" should read --$n_e$--.

At column 8, line 28, "$\Delta n_o$" should read --$\Delta n_e$--.

At column 8, line 28, "$n_o$" at the second occurrence should read --$n_e$--.

At column 8, equation (4), "$\Delta n_{oe}$" should read --$\Delta n_{oa}$--.

UNITED STATES PATENT AND TRADE MARK OFFICE
CERTIFICATE OF CORRECTION

PATENT NO. : 5,737,296
DATED : April 7, 1998
INVENTOR(S) : Komma et al.

It is certified that error appears in the above-identified patent and that said Letters Patent is hereby corrected as shown below:

At column 9, at the line following equation (9), "m-0" should read --$m = 0$--.

At column 9, equation (10), "$\Delta n_o \Delta n_{oe} - \Delta n_e \Delta n_{oe}$" should read --$\Delta n_o \Delta n_{ea} - \Delta n_e \Delta n_{oa}$--.

At column 9, equation (11), "$\Delta n_o \Delta n_o - \Delta n_{ea} \Delta n_{ea}$" should read --$\Delta n_e \Delta n_{oa} - \Delta n_o \Delta n_{ea}$--.

At column 12, line 15, "so" between "detection" and "surface" should be deleted.

At column 12, line 56, "plum" should read --plus--.

At column 14, equation (13), "TE1-TE01" should read --$TE1 = TE01$--.

At column 14, equation (15), "TE0" should read --TE03--.

At column 14, line 49, "a t racking" should read --a tracking--.

At column 15, line 10, "N-1" should read --$N = 1$--.

At column 16, --$FE =$-- should be inserted at the head of equation (18).

UNITED STATES PATENT AND TRADE MARK OFFICE
CERTIFICATE OF CORRECTION

PATENT NO. : 5,737,296
DATED : April 7, 1998
INVENTOR(S) : Komma et al.

It is certified that error appears in the above-identified patent and that said Letters Patent is hereby corrected as shown below:

At column 16, equation (19), "TE1-TE11" should read --TE1=TE11--.

At column 16, equation (20), "TE2-TE12" should read --TE2=TE12--.

At column 16, equation (22), "RF-TE11" should read --RF=TE11--.

At column 18, equation (24), "FE25-FE25" should read --FE26-FE25--.

At column 19, line 10, "N-1" should read --N=1--.

At column 20, equation (31), "TE1-TE31" should read --TE1=TE31--.

UNITED STATES PATENT AND TRADE MARK OFFICE
CERTIFICATE OF CORRECTION

PATENT NO.   : 5,737,296
DATED        : April 7, 1998
INVENTOR(S)  : Komma et al.

It is certified that error appears in the above-identified patent and that said Letters Patent is hereby corrected as shown below:

At column 20, equation (32), "TE2-TE32" should read --TE2=TE32--.

At column 21, line 45, "N-1" should read --N=1--.

At column 25, line 35, "N-1" should read --N=1--.

At column 30, at the second line below equation (55), "used, As" should read --used. As--.

At column 34, line 62 (the eleventh line of claim 4), "X>0" should read --X<0--.

Signed and Sealed this

Sixteenth Day of March, 1999

*Attest:*

Q. TODD DICKINSON

*Attesting Officer*    Acting Commissioner of Patents and Trademarks